(12) United States Patent
Sadilek et al.

(10) Patent No.: US 11,601,036 B2
(45) Date of Patent: Mar. 7, 2023

(54) AC-DC POWER CONVERSION SYSTEM WITH ZERO VOLTAGE SWITCHING

(71) Applicant: DELTA ELECTRONICS, INC., Neihu (TW)

(72) Inventors: Tomas Sadilek, Durham, NC (US); Yungtaek Jang, Cary, NC (US); Peter Barbosa, Durham, NC (US)

(73) Assignee: DELTA ELECTRONICS, INC., Neihu (TW)

( * ) Notice: Subject to any disclaimer, the term of this patent is extended or adjusted under 35 U.S.C. 154(b) by 0 days.

(21) Appl. No.: 17/233,272

(22) Filed: Apr. 16, 2021

(65) Prior Publication Data

US 2022/0345026 A1 Oct. 27, 2022

(51) Int. Cl.
*H02M 1/00* (2006.01)
*H02M 3/335* (2006.01)

(52) U.S. Cl.
CPC ..... *H02M 1/0058* (2021.05); *H02M 3/33584* (2013.01); *H02M 3/33592* (2013.01)

(58) Field of Classification Search
CPC .......... H02M 3/33584; H02M 1/0058
See application file for complete search history.

(56) References Cited

U.S. PATENT DOCUMENTS

| | | | |
|---|---|---|---|
| 5,410,467 A | 4/1995 | Smith et al. | |
| 6,051,961 A | 4/2000 | Jang et al. | |
| 6,987,675 B2 | 1/2006 | Jovanovic et al. | |
| 7,142,439 B2 | 11/2006 | Oh | |
| 9,490,694 B2 * | 11/2016 | Alam | H02M 1/44 |
| 9,705,411 B2 | 7/2017 | Jang et al. | |
| 10,483,862 B1 * | 11/2019 | Cook | H02M 1/088 |
| 2004/0036451 A1 * | 2/2004 | Itoh | H02M 3/158 |
| | | | 323/225 |
| 2008/0316775 A1 | 12/2008 | Tsai et al. | |
| 2014/0268902 A1 * | 9/2014 | Bucheru | H02M 1/4258 |
| | | | 363/21.02 |
| 2014/0301123 A1 * | 10/2014 | Lee | H02M 1/15 |
| | | | 363/132 |
| 2017/0005563 A1 | 1/2017 | Ayyanar | |
| 2017/0302177 A1 * | 10/2017 | LaBella | H02M 1/08 |
| 2017/0302179 A1 * | 10/2017 | Bandyopadhyay | H02M 3/158 |

(Continued)

FOREIGN PATENT DOCUMENTS

| CN | 101325375 B | 2/2008 |
|---|---|---|
| CN | 100553099 C | 10/2009 |

(Continued)

*Primary Examiner* — Sisay G Tiku
(74) *Attorney, Agent, or Firm* — Edward C. Kwok; VLP Law Group LLP

(57) ABSTRACT

A circuit technique substantially reduces the switching losses in an AC-DC power conversion system caused by turn-on characteristics of a main switch and the reverse-recovery characteristic of a rectifier. The losses are reduced by using an active soft-switching cell having a series inductor, a series capacitor, a main switch, a rectifier switch, and an auxiliary switch. The reverse-recovery related losses are reduced by the series inductor connected between the main and rectifier switches to control the rate of current change in the body diode of the rectifier switch during its turn-off. The main switch, the rectifier switch, and the auxiliary switch operate under zero-voltage switching (ZVS) conditions.

18 Claims, 25 Drawing Sheets

(56) References Cited

U.S. PATENT DOCUMENTS

| | | | | |
|---|---|---|---|---|
| 2020/0373839 A1* | 11/2020 | Fu | ......................... | H02M 3/158 |
| 2021/0006149 A1* | 1/2021 | Zong | ..................... | H02M 1/083 |
| 2021/0376754 A1* | 12/2021 | Jang | ........................ | H02M 7/10 |

FOREIGN PATENT DOCUMENTS

| | | | |
|---|---|---|---|
| CN | 103001484 A | | 3/2013 |
| CN | 103501109 A | | 1/2014 |
| CN | 104852567 A | | 8/2015 |
| CN | 107070195 A | | 8/2017 |

\* cited by examiner $V_{AC} > 0$ $D_1$ : TURNED OFF $D_2$ : TURNED ON $V_{AC} < 0$ $D_1$ : TURNED ON $D_2$ : TURNED OFF

AC-DC POWER CONVERSION SYSTEM WITH ZERO VOLTAGE SWITCHING

BACKGROUND OF THE INVENTION

1. Field of the Invention

The present invention generally relates to power conversion systems. More particularly, the present invention relates to bidirectional AC-DC power conversion circuits with soft switching capability.

2. Description of the Related Art

To interface with the AC utility system (i.e., the public power grid), power supplies are required to comply with input-current harmonic standards. In this regard, the limits for low-frequency harmonic distortion are quite stringent and, generally, they are met by imposing a sinusoidal input current to the power converter. In addition, high efficiency, high power density and low electromagnetic interference (EMI) noise are also important considerations. A power converter that interfaces with the AC utility system and achieves low harmonic distortion resembles a resistive load to the AC power supply—i.e., its input current follows the input voltage waveform. One example of such a power converter is a conventional AC-DC boost converter, such as shown in FIG. 1. As a resistive load, the power converter has a sinusoidal input current.

As shown in FIG. 1, conventional AC-DC boost converter 100 includes an input diode bridge formed by rectifiers $D_1$, $D_2$, $D_3$, and $D_4$, boost inductor L, switching device S, boost diode D, filter capacitor C, and load R. In FIG. 1, load R is represented by a resistor. However, load R may also be another downstream converter (e.g., an isolated DC-DC converter that regulates a DC voltage supplied to the actual end-user load). Under suitable control, AC-DC boost converter 100 may draw a nearly sinusoidal AC input current, resulting in a close-to-unity power factor.

Besides aiming for a high power factor, a designer may also seek to achieve an optimized trade-off between efficiency and power density. A high volumetric power density may be achieved by increasing the power converter's switching frequency, which tends to reduce the required size of the magnetic components (e.g., boost inductors and EMI filters). However, operating at a high switching frequency increases switching losses, which decreases efficiency. In the prior art, switching device S and boost diode D in AC-DC boost converter 100 are often implemented using silicon MOSFETs and silicon PN-junction diodes. When operated in hard-switching mode, silicon MOSFETs exhibit excessive turn-on and turn-off losses, as silicon diodes have severe reverse recovery losses. As a result, an increased switching frequency significantly deteriorates AC-DC boost converter 100's power conversion efficiency. To overcome the severe loss at a high switching frequency, soft-switching techniques are developed to smooth transitions in switching device S during turn-on and turn-off events. The resulting reduced rate of change in rectifier diode currents advantageously reduces both the reverse recovery current loss and any related boost diode loss.

FIG. 2 shows AC-DC power converter 200, configured for implementing soft-switching techniques. As shown in FIG. 2, input diodes $D_1$, $D_2$, $D_3$ and $D_4$, boost inductor $L_1$, switching device $S_1$, and boost diode $D_5$ form a conventional boost converter. In addition, AC-DC power converter 200 includes auxiliary circuit 205 formed by auxiliary inductor $L_2$, auxiliary capacitor $C_2$, auxiliary switching device $S_2$ and auxiliary diodes $D_6$ and $D_7$. Auxiliary circuit 205 reduces the rate of current change $$\left(\frac{di}{dt}\right)$$

in boost diode $D_5$ during its turn-off event, so as to substantially remove the reverse recovery loss and to allow a soft turn-on transition in switching device $S_1$ (i.e., zero-voltage switching (ZVS)). ZVS thus provides a significant efficiency improvement, even at an increased switching frequency that achieves a higher power density. Until recently, soft-switching circuits were implemented in most boost converters to reduce reverse recovery losses in the boost diode. Recently, however, wide-band-gap materials (e.g., silicon carbide (SiC)) have yielded Schottky barrier diodes that have substantially no reverse-recovery losses. As a result, AC-DC boost converter 100, implemented using SiC diodes, have become the preferred topology due to its favorable power-factor correction characteristic. A combination of $S_1$ MOSFETs and SiC diodes yield both cost-effectiveness and a reasonable trade-off between efficiency and power density. With their superior switching speed and reduced switching losses, as compared to Si MOSFETs, SiC MOSFETs are expected to provide even greater performance.

FIG. 3 shows conventional totem-pole AC-DC boost converter 300, which has become practical with switching devices $S_1$ and $S_2$ implemented by SiC MOSFETs. Having only two input rectifiers (i.e., input rectifiers $D_1$ and $D_2$), totem-pole AC-DC boost converter 300 operates in a substantially different manner than AC-DC boost converter 100 in that boost diode D's function is performed by the body diodes of switching devices $S_1$ and $S_2$. In addition to topological differences, totem-pole AC-DC boost converter 300 allows bidirectional power flow, thereby expanding its field of application over AC-DC boost converter 100. Thus, SiC MOSFETs achieve both increased switching frequency operation and high efficiency.

Today, SiC MOSFETs are still limited by (i) significant turn-on losses, and (ii) small reverse recovery loss in its body diode at high operating frequencies.

SUMMARY

According to one embodiment of the present invention, soft-switching techniques are applied to smooth turn-on and turn-off transitions in SiC MOSFET switching devices of an AC-DC power converter (e.g., a totem-pole boost converter), thereby avoiding excessive turn-on and reverse-recovery losses when operating at a high switching frequency. The AC-DC power converter thus achieves high efficiency operation, high power density, bidirectional power flow, and reduced EMI noise.

According to one embodiment, a power converter, configured for coupling to an AC circuit and a DC circuit, includes: (a) a first inductor, which has a first terminal coupled to a first terminal of the AC circuit; (b) first and second rectifiers connected at a common node, forming a series circuit that is coupled in parallel to the DC circuit, with the common node coupled to a second terminal of the AC circuit; and (c) an active soft-switching cell that includes: (1) a second inductor; (2) first and second switches, forming, with the second inductor, a series circuit that is coupled in parallel to the series circuit of the first and second rectifiers; (3) a third switch; and (4) a first capacitor, forming, with the third switch, a series circuit that is coupled in parallel to the second inductor. In one embodiment, the active soft-switching cell may reduce the reverse-recovery related losses of the AC-DC power converter. The active soft-switching cell also facilitates zero-voltage switching (ZVS) in the first, second and third switches. At least one of the switches may be provided by a silicon carbide (SiC) metal-oxide-semiconductor field-effect transistor (MOSFET).

In one embodiment, the power converter may be configured to operate in a bidirectional manner: e.g., the DC circuit may include a DC power source (e.g., a battery), or the AC-DC power converter may include a power inverter. The first and second rectifiers may be implemented by either passive diodes or synchronous rectifiers. The first inductor may be coupled to either (i) a common electrical node between the first switch and the second inductor, or (ii) a common electrical node between the second switch and the second inductor.

According to some embodiment of the present invention, an AC-DC power converter may be a multi-phase power converter configured for coupling to an AC circuit and a DC circuit. The AC circuit includes multiple terminals ("phase terminals"), each coupled to a phase of a multi-phase AC power source. The multi-phase power converter includes multiple component circuits ("phase legs"). In one embodiment, each phase leg of the multi-phase power converter include: (a) a first inductor coupled to one of the phase terminals of the AC circuit; and (b) an active soft-switching cell that includes (1) a second inductor; (2) first and second switches forming, with the second inductor, a series circuit that is coupled in parallel to the DC circuit; (3) a third switch; and (4) a first capacitor forming, with the third switch, a series circuit that is coupled in parallel to the second inductor.

As the active soft-switching cell according to the present invention does not increase voltage and current stresses in conventional AC-DC power converters, the active soft-switching cell may be incorporated into most conventional AC-DC power converters to achieve the advantages of the present invention.

The present invention is better understood upon consideration of the following detailed description and the accompanying drawings.

DETAILED DESCRIPTION OF THE PREFERRED EMBODIMENTS

The present invention will now be described more specifically with reference to the following embodiments. It is to be noted that the following descriptions of embodiments of this disclosure are presented herein for purpose of illustration and description only. It is not intended to be exhaustive or to be limited to the precise form disclosed.

Figure 4:
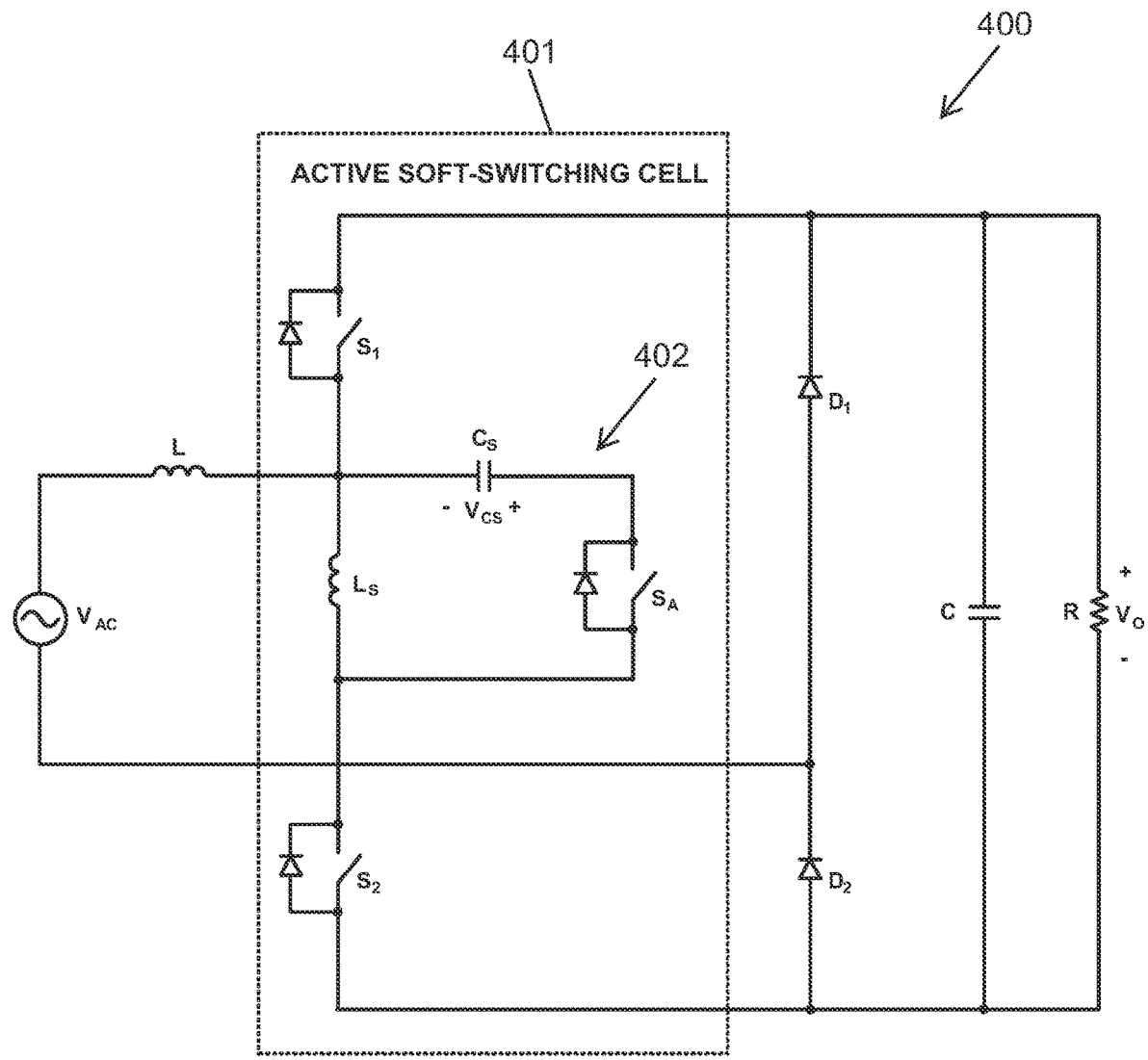
FIG. 4 shows totem-pole pulse-width-modulated (PWM) power-factor-correction (PFC) power converter 400, according to one embodiment of the present invention.

FIG. 4 shows a power converter 400, according to one embodiment of the present invention. As shown in FIG. 4, power converter 400 is a totem-pole pulse-width-modulated (PWM) power-factor-correction (PFC) power converter that performs rectification. As demonstrated below, totem-pole PWM PFC power converter 400 achieves a reduced switching loss. As shown in FIG. 4, totem-pole PWM PFC power converter 400 is coupled between an AC circuit and a DC circuit and includes inductor L, series-connected rectifiers $D_1$ and $D_2$, and active soft-switching cell 401. Inductor L is coupled to one terminal of the AC circuit. The other terminal of the AC circuit is coupled to the common node in the series circuit formed by rectifiers $D_1$ and $D_2$. Active soft-switching cell 401 includes inductor $L_S$, switch $S_1$, switch $S_2$, switch $S_A$, and capacitor $C_S$. In active soft-switching cell 401, (i) inductor $L_S$ and switch $S_1$ form a series circuit that is coupled in parallel to the series circuit of rectifiers $D_1$ and $D_2$; (ii) switch $S_A$ and capacitor $C_S$ form a series circuit 402 that is coupled in parallel to inductor $L_S$; and (iii) inductor L is coupled to either terminal of inductor $L_S$. In FIG. 4, inductor L is coupled to a common electrical node between switch $S_1$ and inductor $L_S$. In one embodiment, at least one of switches $S_1$, $S_2$, and $S_A$ includes a silicon carbide metal-oxide-semiconductor field-effect transistor (MOSFET). In one embodiment, totem-pole PWM PFC power converter 400 may further include a filter capacitor C connected in parallel with rectifiers $D_1$ and $D_2$. During operation, switch $S_1$ or switch $S_2$ serves as boost switch or rectifier switch, according to the polarity of the AC circuit, and switch $S_A$ serves as an auxiliary switch.

Figure 1:
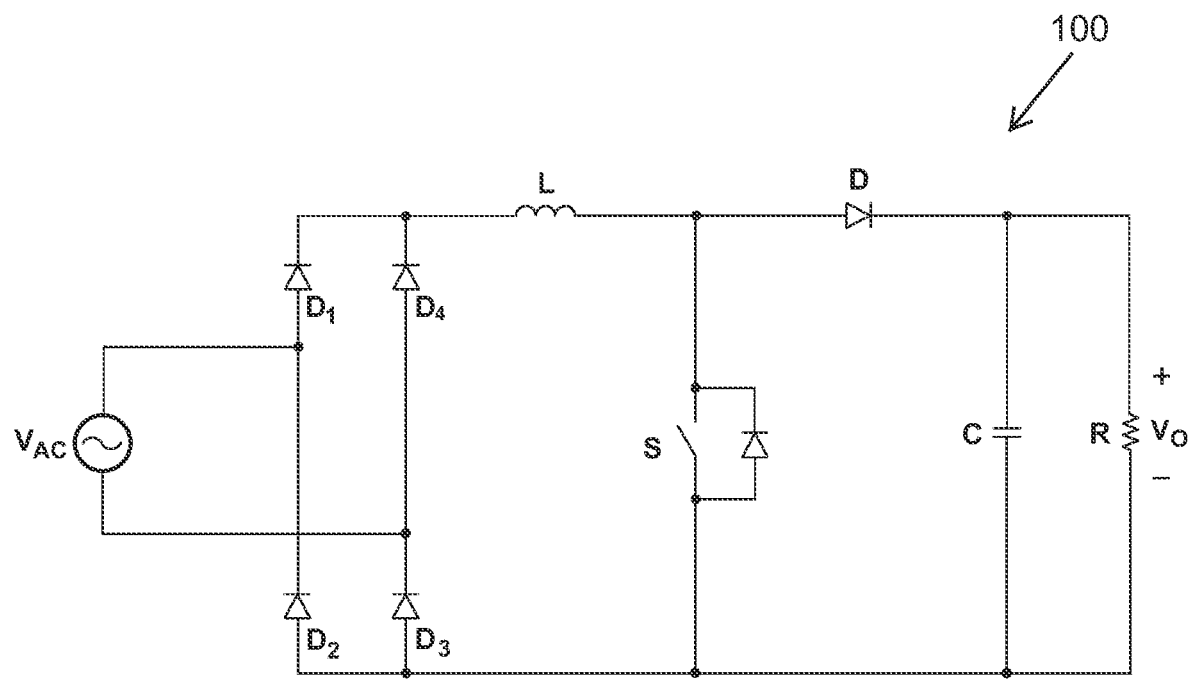
FIG. 1 shows conventional AC-DC boost converter 100.
Figure 2:
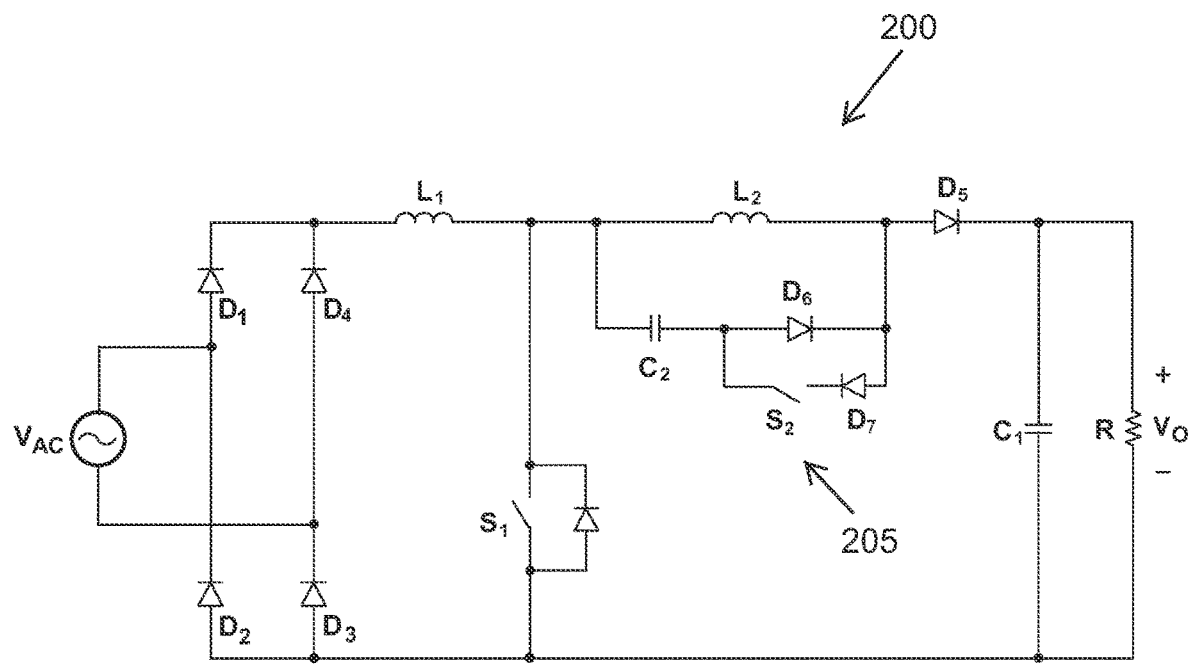
FIG. 2 shows conventional AC-DC power converter 200, configured for implementing soft-switching techniques.
Figure 3:
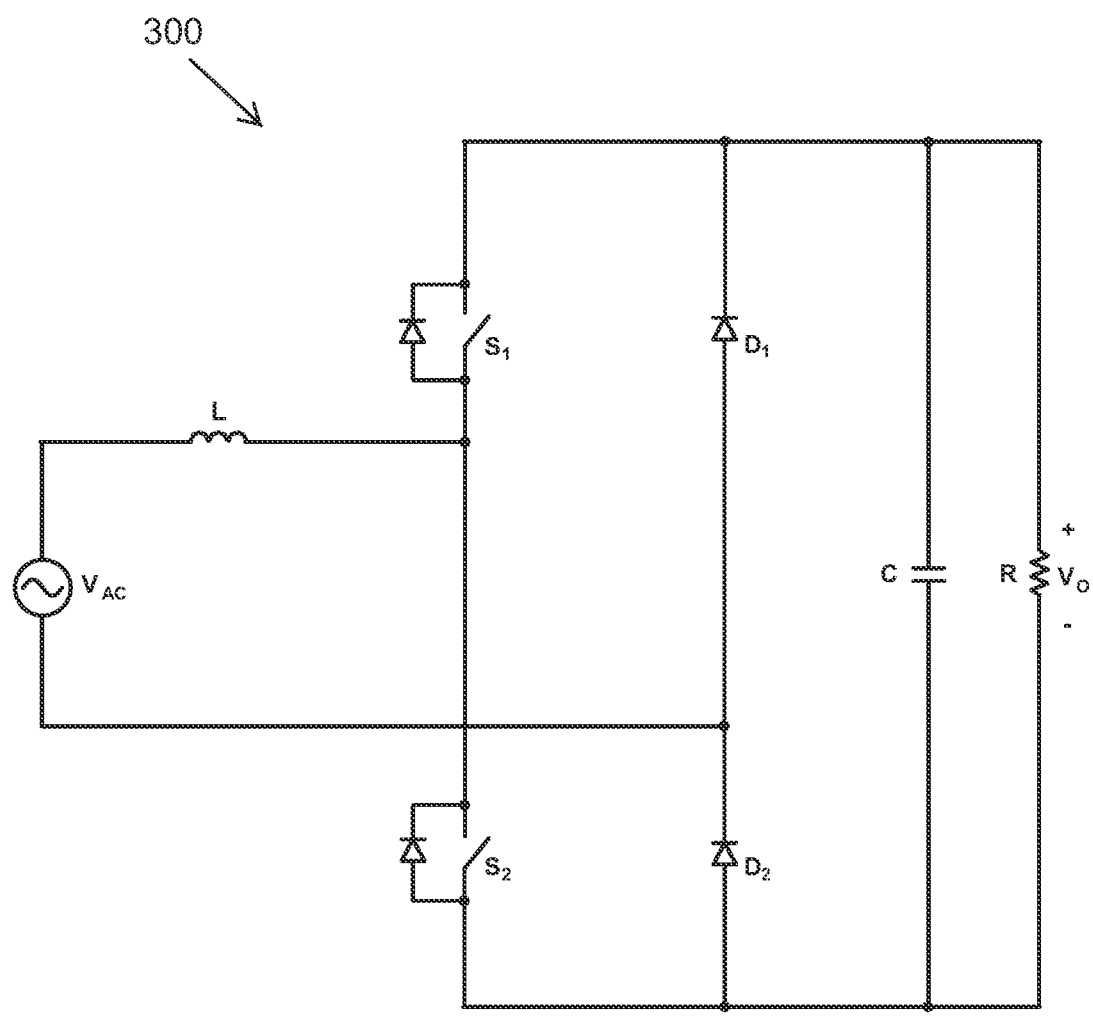
FIG. 3 shows conventional AC-DC totem-pole boost converter 300, which has become practical with switching devices $S_1$ and $S_2$ implemented by SiC MOSFETs.

As shown in FIG. 4, totem-pole PWM PFC power converter 400 differs from AC-DC totem-pole boost converter 300 of FIG. 3 by connecting series inductor $L_S$ between boost or rectifier switches $S_1$ and $S_2$, so as to control the rate of change in current change $$\left(\frac{di}{dt}\right)$$

in the body diode of the rectifier switch when the rectifier switch is open. (During the positive half of each cycle of the input AC voltage, switch $S_2$ serves as a "main" or "boost" switch, while switch $S_1$ serves as a rectifier switch; the roles of the switches reverse during the negative half cycle of the input AC voltage.) Connected in parallel to series inductor $L_S$ are series-connected capacitor $C_S$ and auxiliary switch $S_A$. Switches $S_1$ and $S_2$, series inductor $L_S$, auxiliary switch $S_A$, and capacitor $C_S$ form soft-switching cell 401, as indicated by dashed lines in FIG. 4.

According to one embodiment of the present invention, switches $S_1$, $S_2$, and $S_A$ all operate with ZVS. In addition, the control signals for switches $S_1$ and $S_2$ are asserted in a non-overlapping manner, such that switches $S_1$ and $S_2$ do not conduct at the same time. In this detailed description, when the control signal of a switch is asserted, the switch closes or is said to be "turned on." Conversely, when the control signal of a switch is de-asserted, the switch opens or is said to be "turned off." In one embodiment, at any given time, either switch $S_1$ or switch $S_2$ serves as a rectifier switch which opens or closes simultaneously with switch $S_A$. Inductor $L_S$ reduces the rate of current change when the rectifier switch opens. The control signal for auxiliary switch $S_A$ is asserted simultaneously with the rectifier switch (i.e., switch $S_1$, during the positive half of the line cycle, and switch $S_2$, during the negative half of the line cycle). A short delay ("dead time") is introduced between de-assertion of the control signal on the main switch and assertions of the control signals on the rectifier switch and auxiliary switch $S_A$. In this embodiment, when the main switch is turned off, the portion of the input current flowing through series inductor $L_S$ (i.e., $i_{LS}$) is diverted from the main switch and redirected to flow through the body diodes of the rectifier switch and auxiliary switch $S_A$, thereby discharging both the rectifier switch's and auxiliary switch $S_A$'s parasitic output capacitances to allow closing both the rectifier switch and auxiliary switch $S_A$ under ZVS condition. When the rectifier switch and auxiliary switch $S_A$ subsequently turn off, however, current $i_{LS}$ in series inductor $L_S$ still flows through the body diode of the rectifier switch, discharging the main switch's parasitic output capacitance to create a ZVS condition for the main switch to turn on. Without the discharging of the main switch's parasitic output capacitance, as is the case in prior art topologies, turning on the main switch results in a large turn-on loss. In addition, when the main switch turns on, series inductor $L_S$ lowers the rate of change in the rectifier switch current, which significantly reduces the rectifier switch's reverse-recovery loss.

Figure 14:
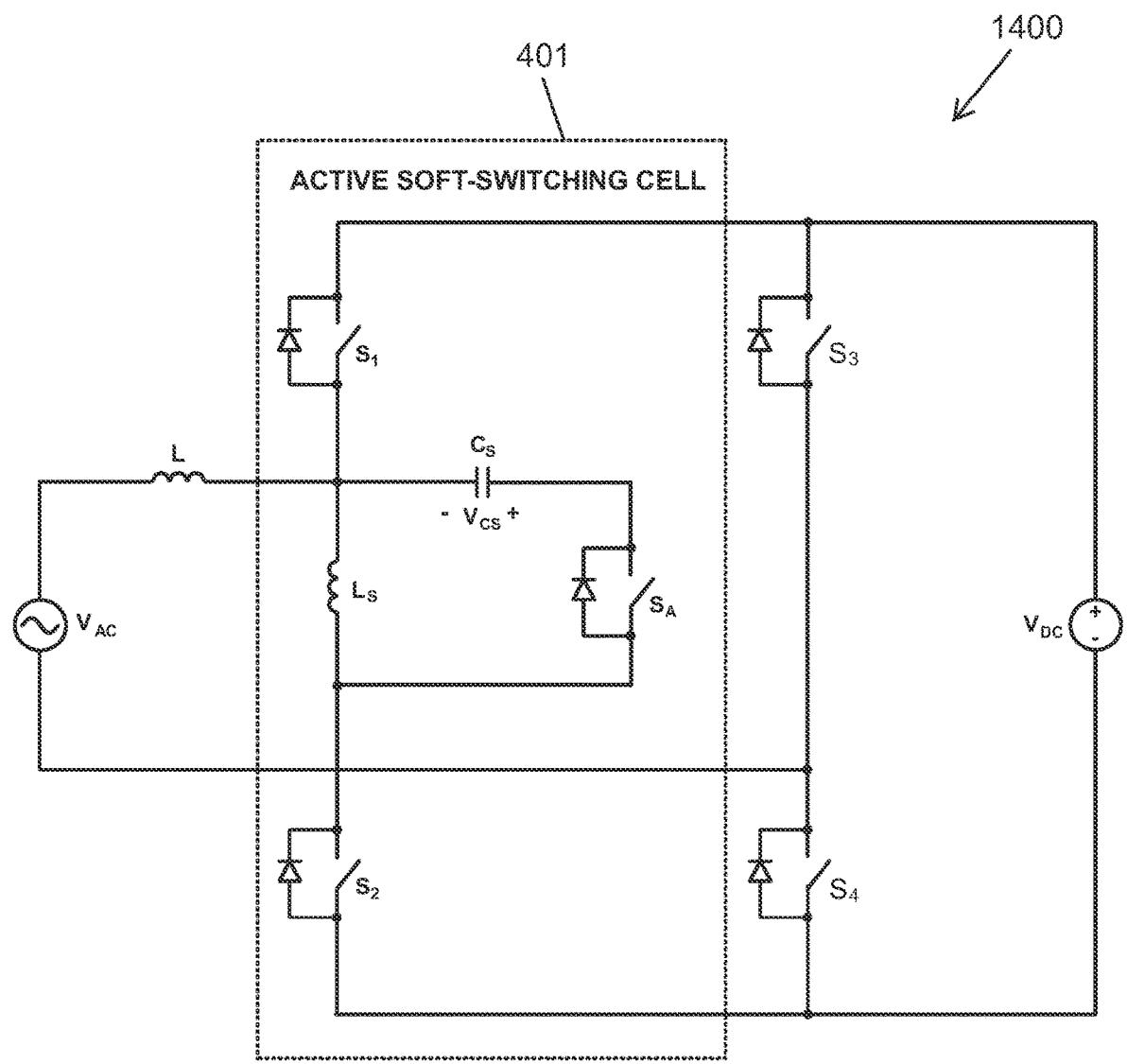
FIG. 14 shows active soft-switching cell 401 being incorporated into bidirectional AC-DC totem-pole power converter 1400, in accordance with one embodiment of the present invention; unlike totem-pole PWM PFC power converter 400, diodes $D_1$ and $D_2$ are replaced by synchronous rectifiers $S_3$ and $S_4$.

Note that the following analysis uses totem-pole AC PWM PFC power converter 400 as an example. The analysis would be the same for a bidirectional operation, in which resistive load R in FIG. 4 is replaced by a DC voltage source (e.g., a battery). In that bidirectional configuration, filter capacitor C is optional. See, e.g., FIG. 14, showing bidirectional AC-DC power converter 1400.

Figure 5:
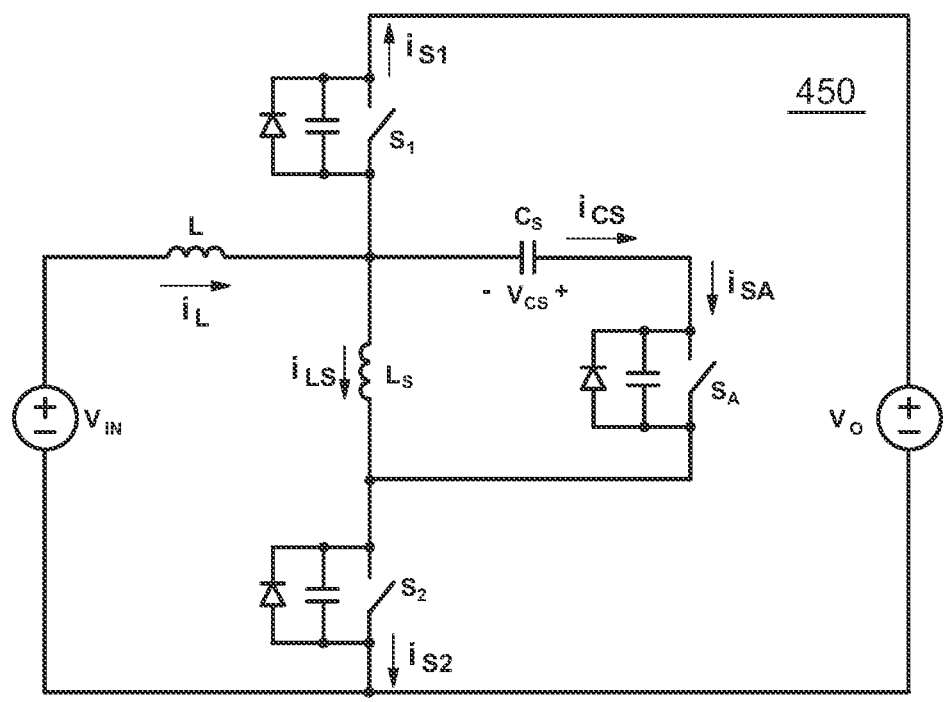
FIG. 5 shows circuit model 450, representing an equivalent circuit for totem-pole PWM PFC power converter 400 during the positive half-cycle of input voltage $V_{AC}$ (i.e., $V_{AC}>0$).
Figure 8:
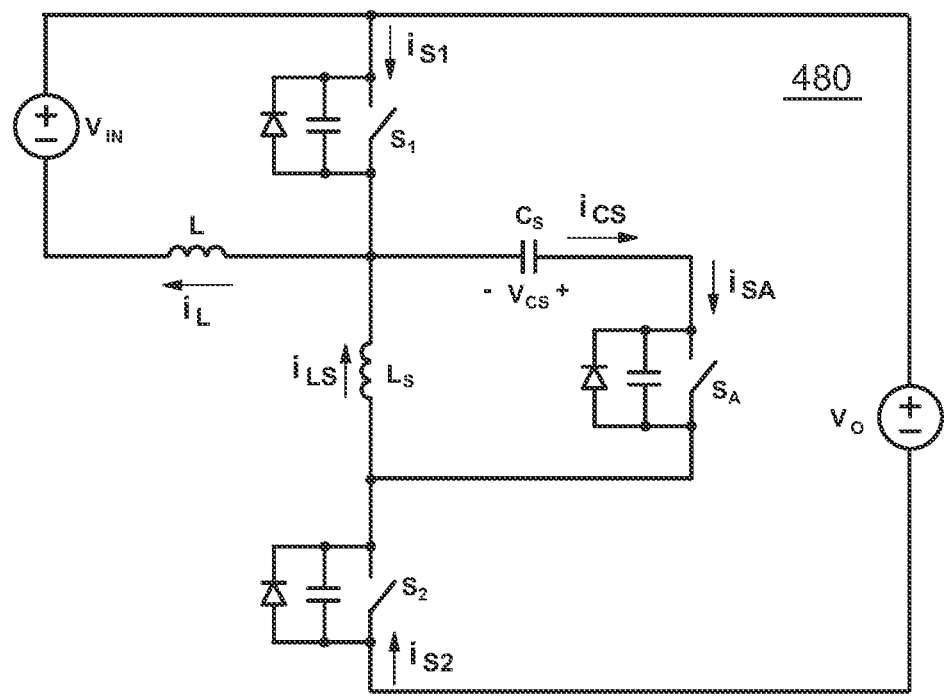
FIG. 8 shows circuit model 480, representing an equivalent circuit for totem-pole PWM PFC power converter 400 during the negative half-cycle of input voltage $V_{AC}$ (i.e., $V_{AC}<0$).
Figure 9A:
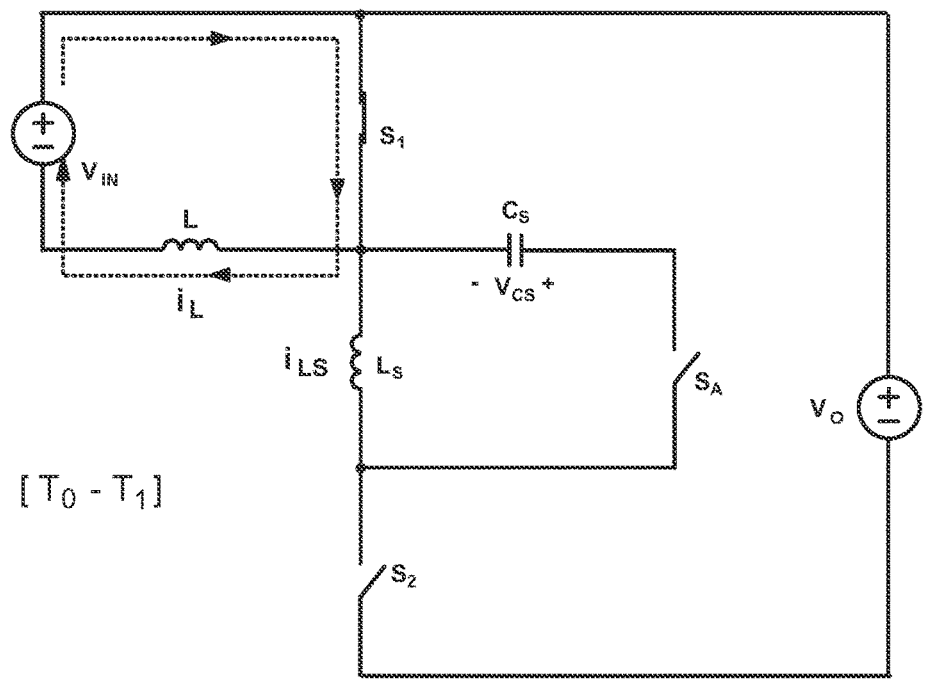
FIGS. 9A, 9B, 9C, 9D, 9E, 9F, 9G, 9H and 9I show the topological states of totem-pole PWM PFC power converter 400 over switching cycle $T_S$ during the negative half-cycle of input voltage $V_{AC}$.
Figure 9B:
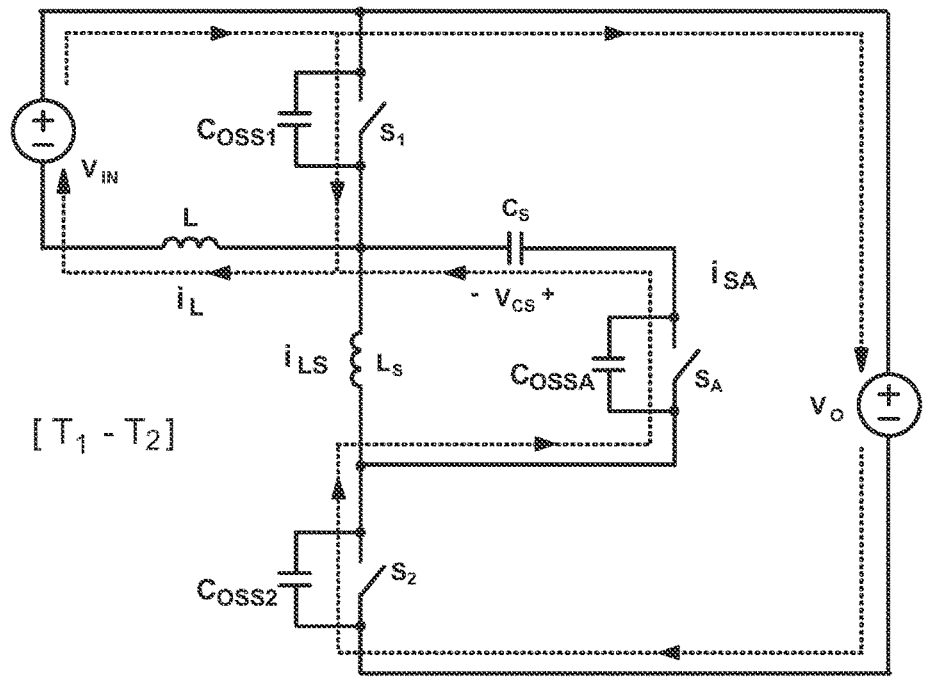
Figure 9C:
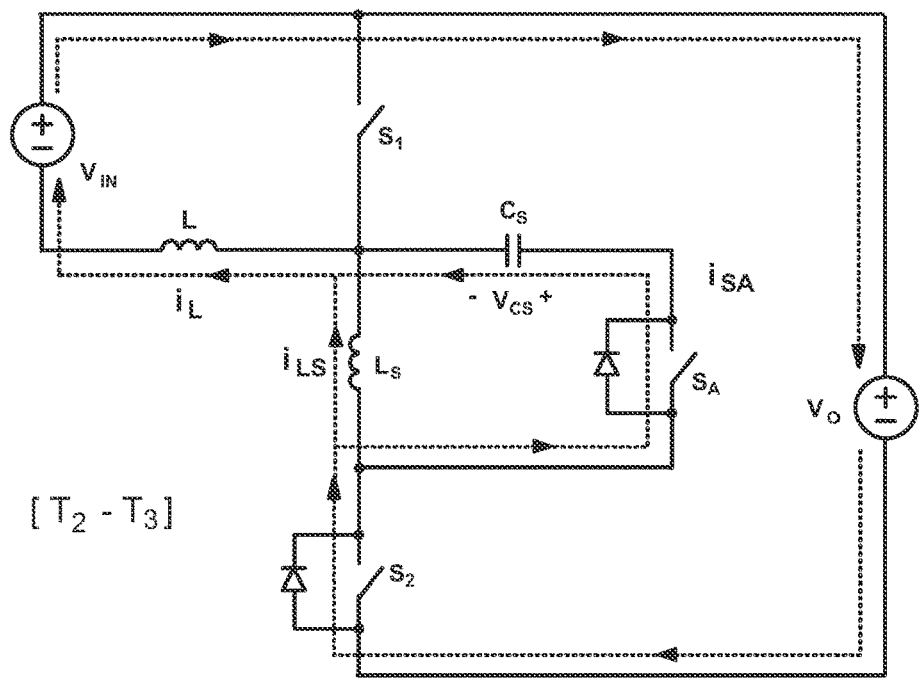
Figure 9D:
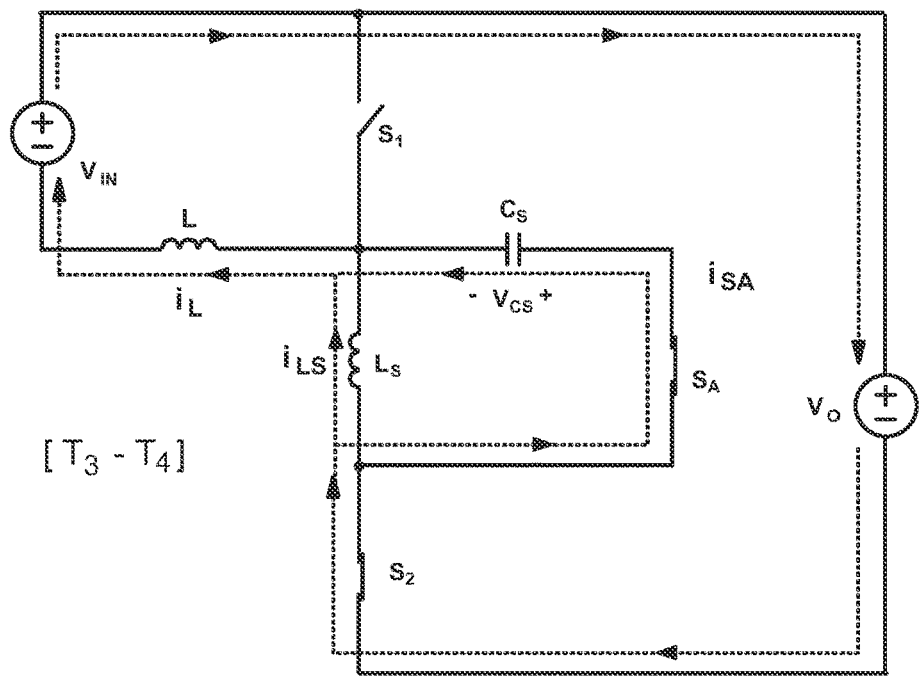
Figure 9E:
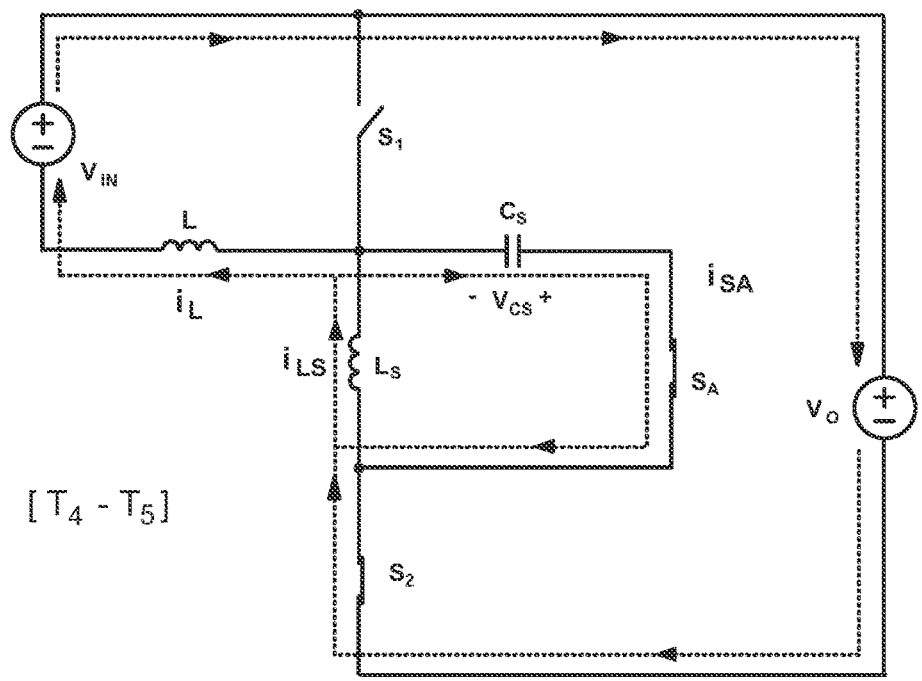
Figure 9F:
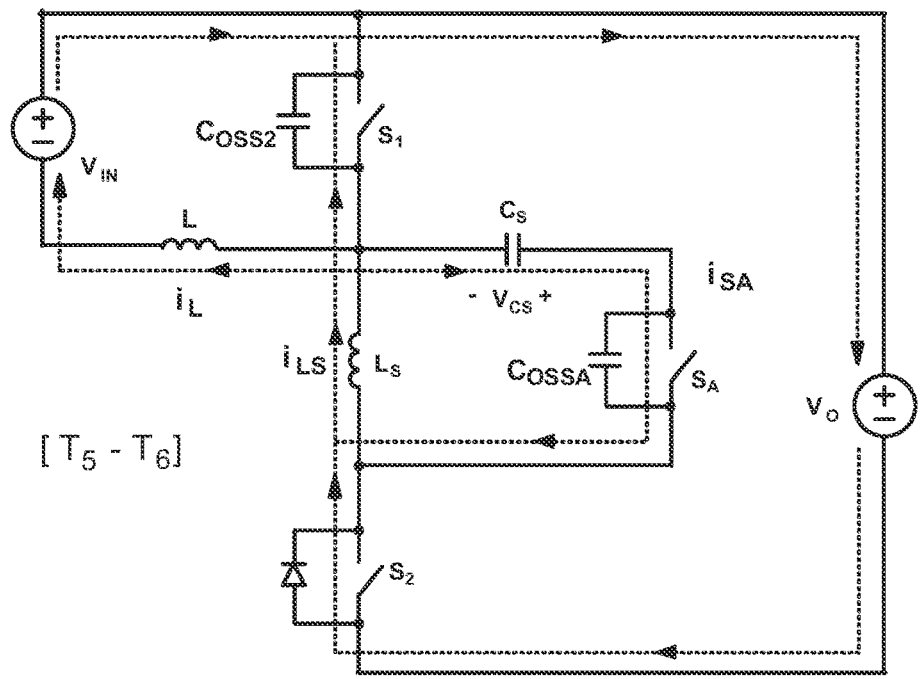
Figure 9G:
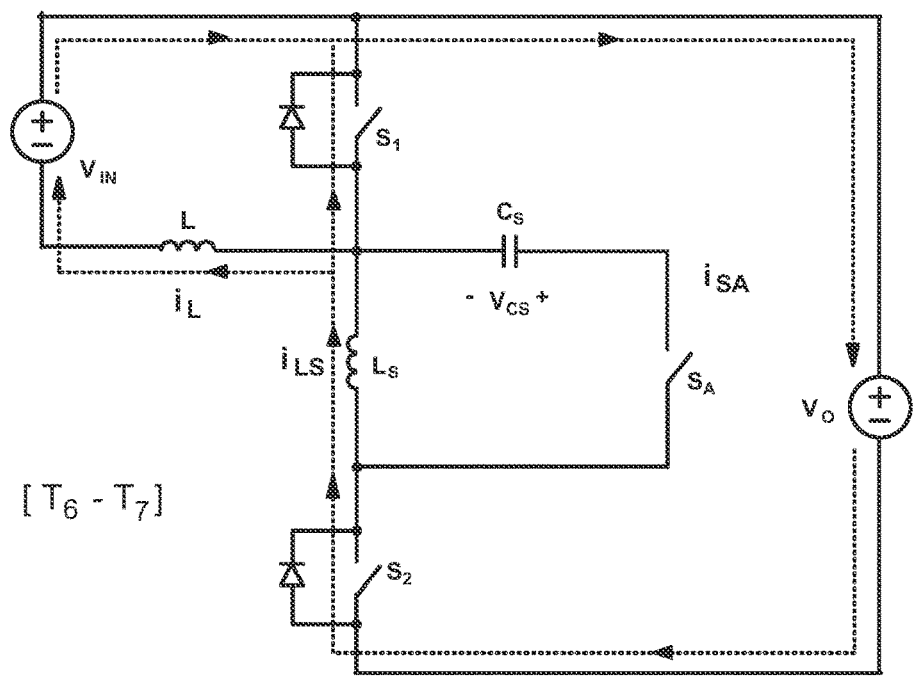
Figure 9H:
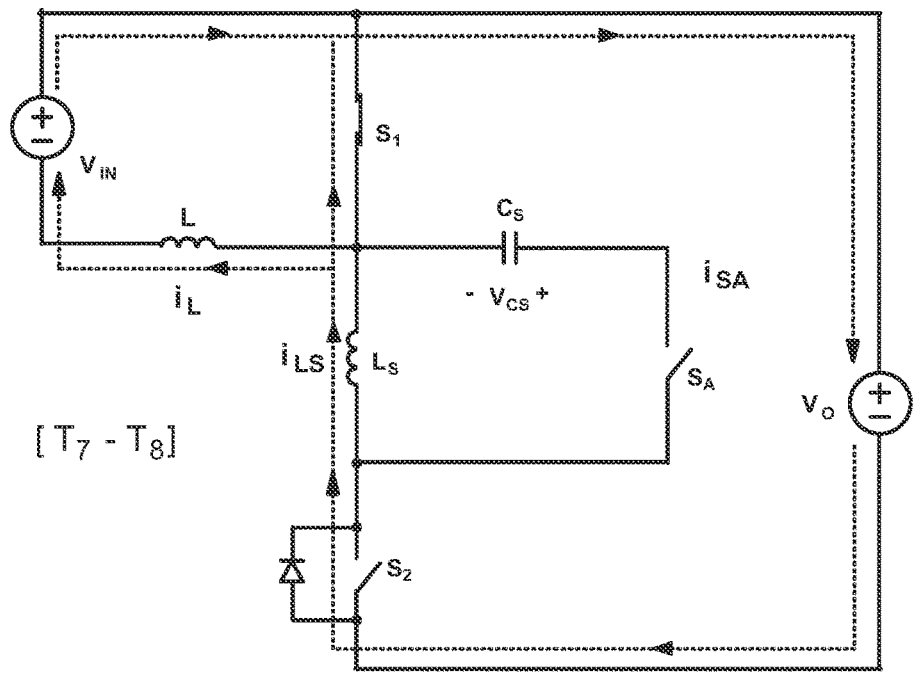
Figure 9I:
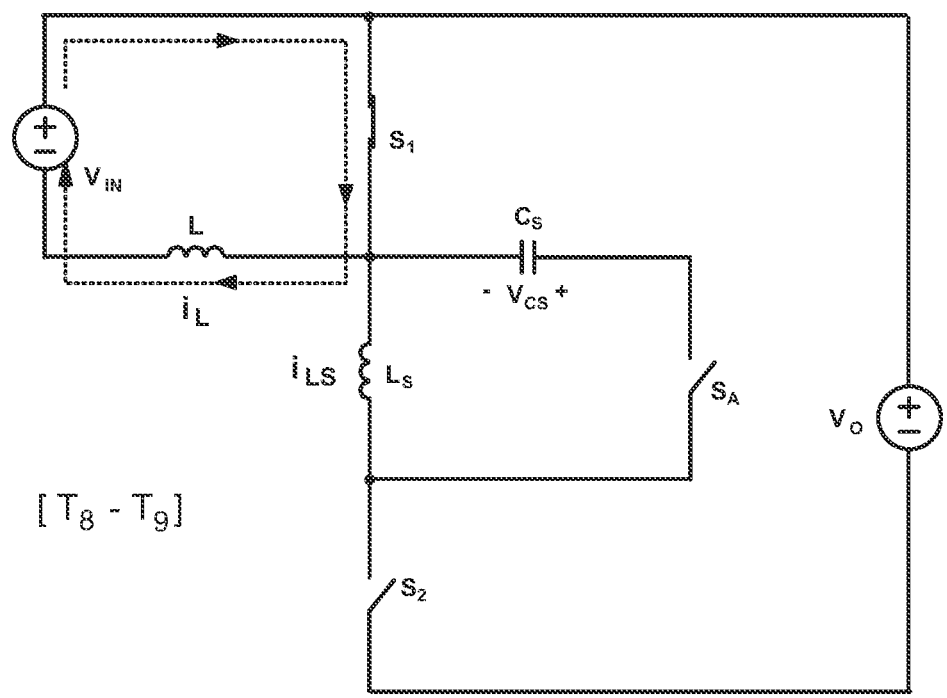

In totem-pole PWM PFC power converter 400, the switching frequency of switches $S_1$, $S_2$, and $S_A$ is much higher than the line frequency of input voltage $V_{AC}$. Consequently, for the purpose of the following analysis, within the time frame of a few switching cycles, input voltage $V_{AC}$ may be seen as a substantially constant voltage $V_{IN}$. Also, as the inductance of boost inductor L and the capacitance of filter capacitor C are both large, as compared to the inductances and the capacitances of other circuit elements in totem-pole PWM PFC power converter 400, both the ripples in inductor current $i_L$ and the ripples in the voltage across filter capacitor C may be deemed insignificant. Accordingly, the voltage across output filter capacitor C may be represented by constant voltage source Vo. Similarly, switches $S_1$, $S_2$ and $S_A$ each have an insignificant resistance in their respective conducting states ("on-resistance"). During their conducting states, each of these switches may be considered a short circuit. However, the parasitic output capacitances of these switches (i.e., capacitors $C_{OSS1}$, $C_{OSS2}$ and $C_{OSSA}$) and the reverse-recovery charge in each of their body diodes are not neglected. Based on these considerations, FIGS. 5 and 8 show circuit models 450 and 480, representing the equivalent circuits for totem-pole PWM PFC power converter 400 under, respectively, the positive half-cycle (i.e., $V_{AC}>0$) and the negative half-cycle (i.e., $V_{AC}<0$) of input voltage $V_{AC}$.

Based on circuit model 450 of FIG. 5, FIGS. 6A-6I show the topological states of totem-pole PWM PFC power converter 400 over switching cycle $T_S$ during the positive half-cycle of input voltage $V_{AC}$ (i.e., $V_{AC}>0$). FIG. 7 shows key power stage waveforms over switching cycle $T_S$ during the positive half-cycle of input voltage $V_{AC}$ (i.e., $V_{AC}>0$).

Likewise, based on circuit model 480 of FIG. 8, FIGS. 9A-9I show the topological states of totem-pole PWM PFC power converter 400 over switching cycle $T_S$ during the negative half-cycle of input voltage $V_{AC}$ (i.e., $V_{AC}<0$). FIG.

10 shows key power stage waveforms over switching cycle $T_S$ during the negative half-cycle of input voltage $V_{AC}$ (i.e., $V_{AC}<0$).

Figure 6A:
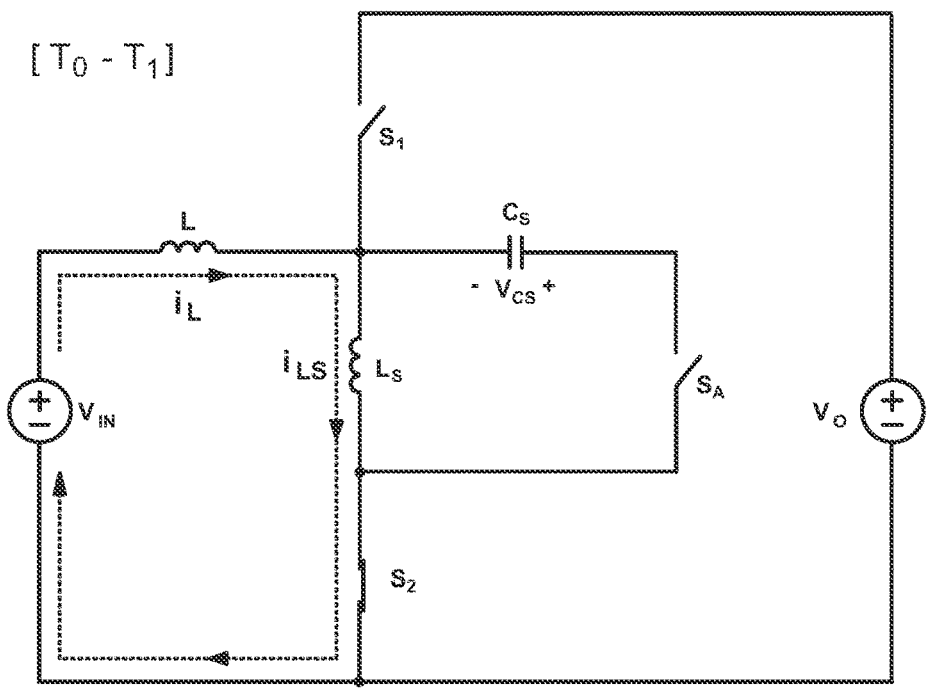
FIGS. 6A, 6B, 6C, 6D, 6E, 6F, 6G, 6H and 6I show the topological states of totem-pole PWM PFC power converter 400 over switching cycle $T_S$ during the positive half-cycle of input voltage $V_{AC}$.
Figure 7:
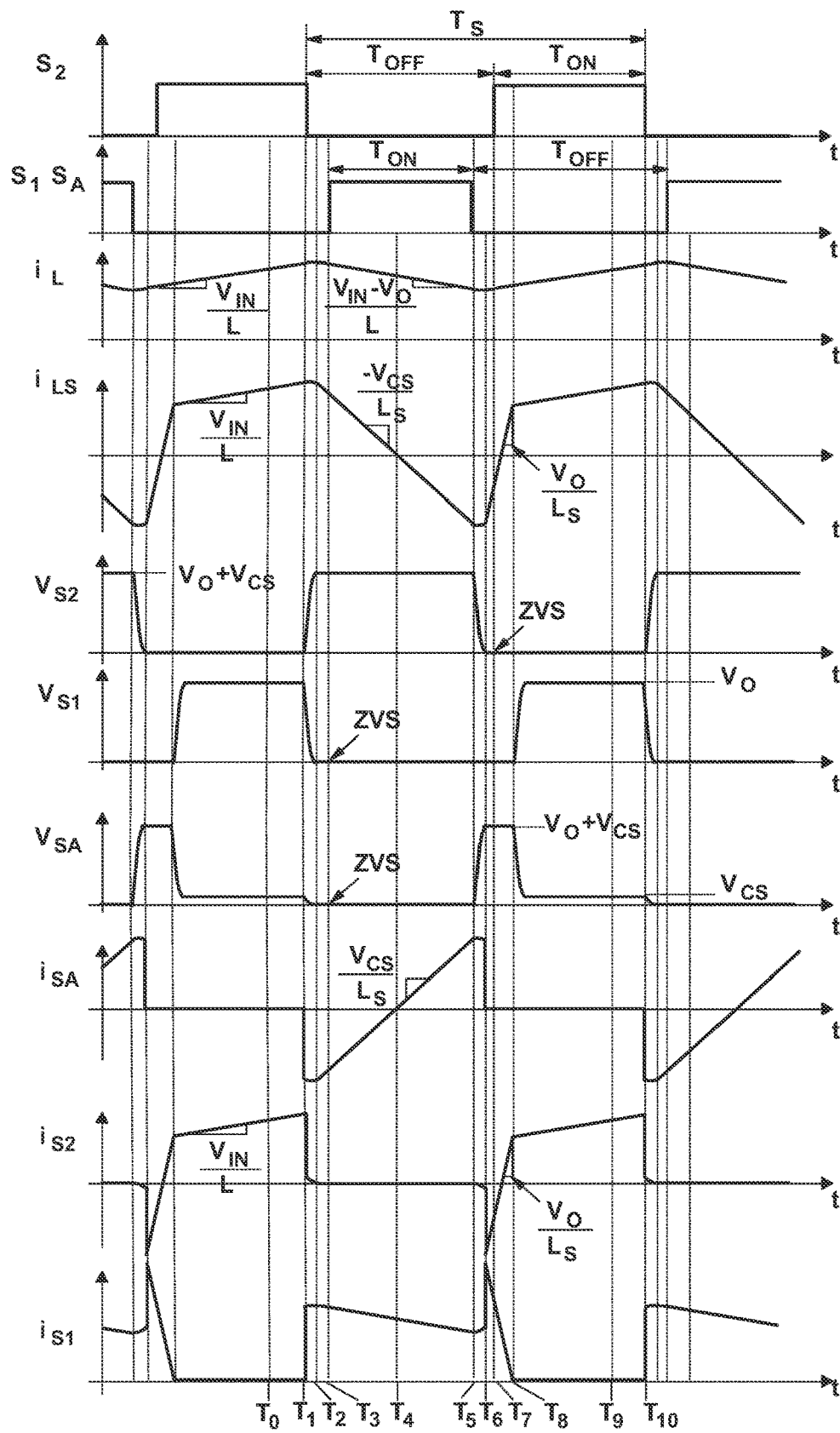
FIG. 7 shows key power stage waveforms over switching cycle $T_S$ during the positive half-cycle of input voltage $V_{AC}$ (i.e., $V_{AC}>0$).

As shown in FIG. 6A, during interval $[T_0, T_1]$, main switch $S_2$ is turned on—but is about to be turned off at time $T_1$—booth boost inductor current $i_L$ and series inductor current $i_{LS}$ flow in main switch $S_2$, while rectifier switch $S_1$ and auxiliary switch $S_A$ are turned off. Since the inductance in boost inductor L is much larger than the inductance of series inductor $L_S$, substantially all of input voltage $V_{IN}$ is imposed across boost inductor L. Therefore, (i) voltage $V_O$ across filter capacitor C is imposed across main switch $S_2$, (ii) voltage $V_{CS}$ across series capacitor $C_S$ is imposed across auxiliary switch $S_A$, and (iii) input voltage $V_{IN}$ is imposed across series-connected boost inductor L and series inductor $L_S$. Hence, boost inductor current $i_L$ and series inductor current $i_{LS}$ increase linearly according to:

$$\frac{di_L}{dt} = \frac{di_{LS}}{dt} = \frac{V_{IN}}{L+L_S} \quad (1)$$

where L and $L_S$ in this and other equations represent the inductances of boost inductor L and series inductor $L_S$, respectively.

Figure 6B:
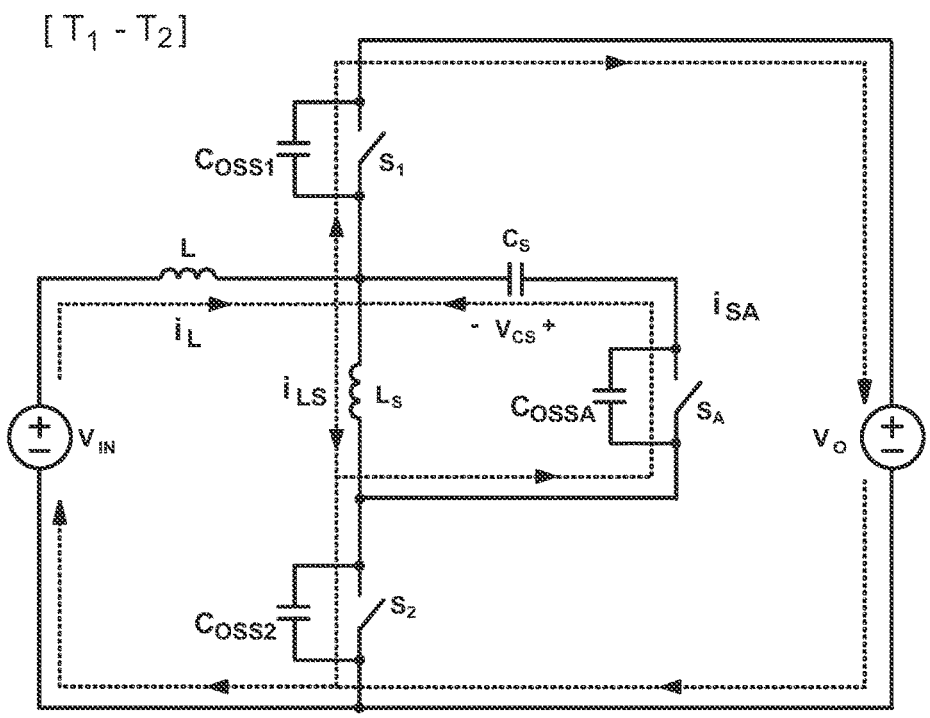

FIG. 6B shows the topological state of totem-pole PWM PFC power converter 400 during interval $[T_1, T_2]$. As shown in FIG. 6B, after main switch $S_2$ turns off at time $T_1$, series inductor current $i_{LS}$, which is substantially equal to boost inductor current $i_L$ at time $T_1$, begins to charge parasitic output capacitance $C_{OSS2}$ of main switch $S_2$. As a result, voltage $V_{S2}$ across main switch $S_2$ begins to increase. Kirchhoff's Voltage Loop (KVL) around rectifier switch $S_1$, auxiliary switch $S_A$, main switch $S_2$, series capacitor $C_S$ and output voltage $V_O$ provides:

$$V_{S1} - V_{CS} + V_{SA} + V_{S2} = V_O \quad (2)$$

where $V_{S1}$, $V_{CS}$, $V_{SA}$ and $V_{S2}$ are voltages across rectifier switch $S_1$, series capacitor $C_S$, auxiliary switch $S_A$, and main switch $S_2$, respectively As the capacitance of series capacitor $C_S$ is selected to be much larger than the parasitic output capacitance of the switches (i.e., $C_S \gg C_{OSS1}$, $C_{OSS2}$, and $C_{OSSA}$), voltage $V_{CS}$ across series capacitor $C_S$ can be deemed constant. Thus, Equation (2) provides:

$$\frac{dV_{S2}}{dt} = -\frac{d(V_{S1}+V_{SA})}{dt} \quad (3)$$

In other words, during interval $[T_1, T_2]$, parasitic output capacitance $C_{OSS1}$ of rectifier switch $S_1$ and parasitic output capacitance $C_{OSSA}$ of auxiliary switch $S_A$ are discharging, while parasitic output capacitance $C_{OSS2}$ of main switch $S_2$ is charging. Furthermore, when voltage $V_{SA}$ across switch $S_A$ reaches 0 volts, the body diode of auxiliary switch $S_A$ turns on, and the voltages across rectifier switch $S_1$ and main switch $S_2$ is given by:

$$\frac{dV_{S2}}{dt} = -\frac{d(V_{S1})}{dt} \quad (4)$$

as shown in FIG. 7. Interval $[T_1, T_2]$ is expected to be very short relative to the switching cycle $T_S$, as parasitic output capacitances $C_{OSS1}$ and $C_{OSS2}$ of rectifier and main switches $S_1$ and $S_2$ are typically less than 1 nF.

Figure 6C:
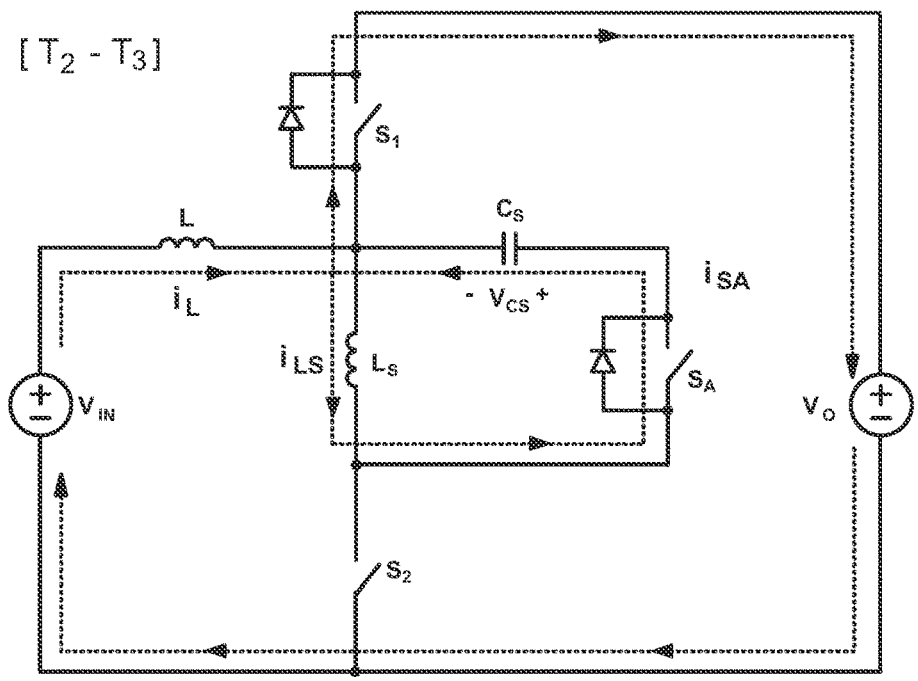

FIG. 6(c) shows the topological state of totem-pole PWM PFC power converter 400 during interval $[T_2, T_3]$. At time $T_2$, when parasitic output capacitance $C_{OSS1}$ of rectifier switch $S_1$ has fully discharged, the body diode of rectifier switch $S_1$ becomes conducting and carries boost inductor current $i_L$, thereby transferring power from the input voltage source to the output load. During interval $[T_2, T_3]$, the voltage across boost inductor L equals the difference between output voltage $V_O$ and input voltage $V_{IN}$, so that boost inductor current $i_L$ decreases linearly according to $$\frac{di_L}{dt} = \frac{V_{IN}-V_O}{L}.$$

At the same time, the body diode of auxiliary switch $S_A$ conducts current $i_{LS}$, so that voltage $V_{CS}$ across series capacitor $C_S$ is imposed across series inductor $L_S$. Consequently, series inductor current $i_{LS}$ decreases linearly, according to $$\frac{di_{LS}}{dt} = \frac{-V_{CS}}{L_S}.$$

Figure 6D:
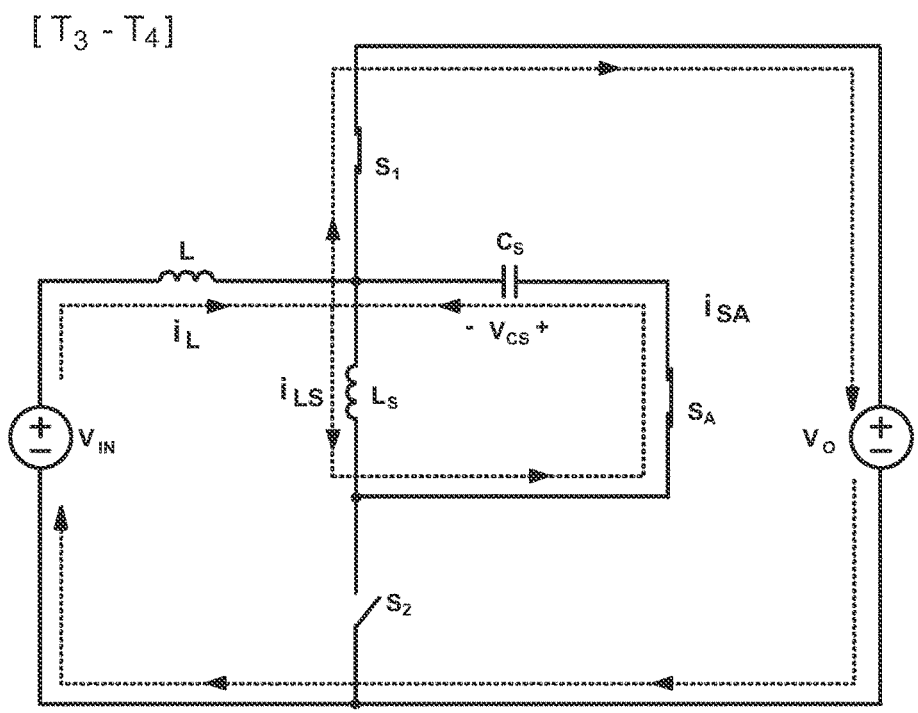

FIG. 6D shows the topological state of totem-pole PWM PFC power converter 400 during interval $[T_3, T_4]$. At time $T_3$, both auxiliary switch $S_A$ and rectifier switch $S_1$ turn on under ZVS condition. At this point, the commutation cycle is complete and totem-pole PWM PFC power converter 400 enters the topological states for interval $[T_3, T_5]$ in which substantially all of boost inductor current $i_L$ is delivered to the output.

Figure 6E:
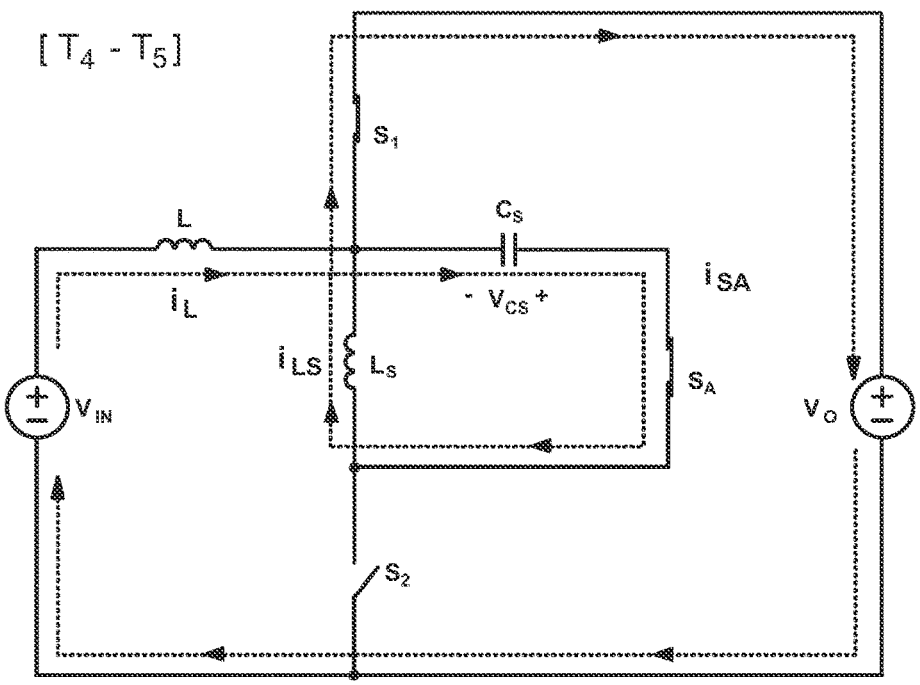

FIG. 6E shows the topological state of totem-pole PWM PFC power converter 400 during interval $[T_4, T_5]$. At time $T_4$, after auxiliary switch $S_A$ closes at time $T_3$, series inductor current $i_{LS}$ crosses zero and turns negative, while current $i_{SA}$ in auxiliary switch $S_A$ reverses polarity to turn positive.

Figure 6F:
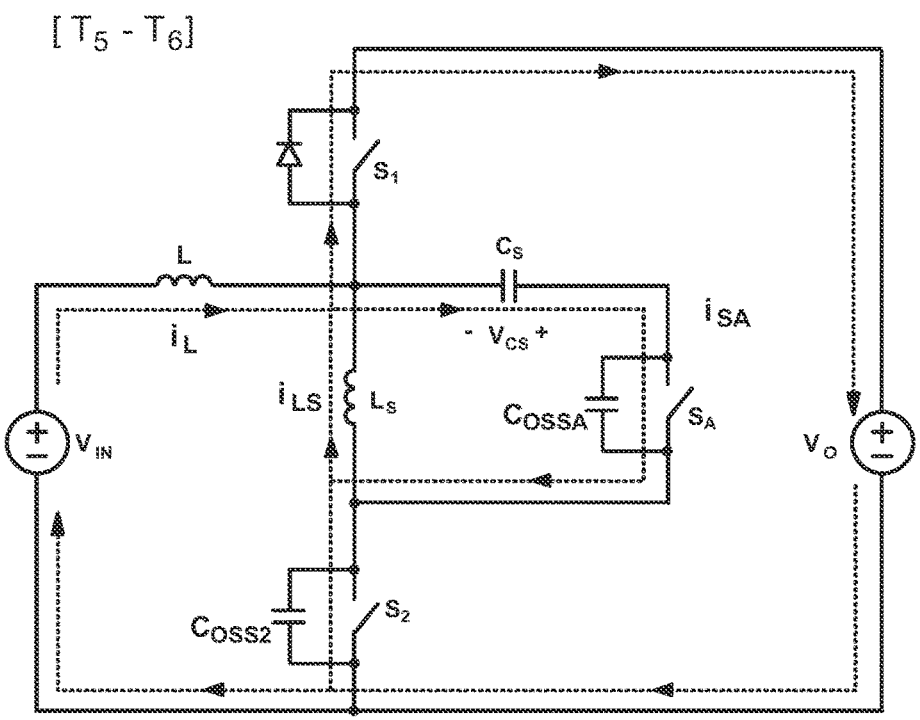

FIG. 6F shows the topological state of totem-pole PWM PFC power converter 400 during interval $[T_5, T_6]$. At time $T_5$, both rectifier switch $S_1$ and auxiliary switch $S_A$ turn off. Voltage $V_{S1}$ across rectifier switch $S_1$ remains small, as the input current still flows through the body diode of switch $S_1$. However, as series inductor current $i_{LS}$ is now negative, parasitic output capacitance $C_{OSSA}$ of auxiliary switch $S_A$ begins to charge. From Equation (2) above, a voltage increase across auxiliary switch $S_A$—due to charging of its parasitic output capacitance $C_{OSSA}$—results in a corresponding voltage decrease across parasitic output capacitance $C_{OSS2}$ of main switch $S_2$, by virtue of its discharging of the parasitic output capacitance $C_{OSS2}$.

Figure 6G:
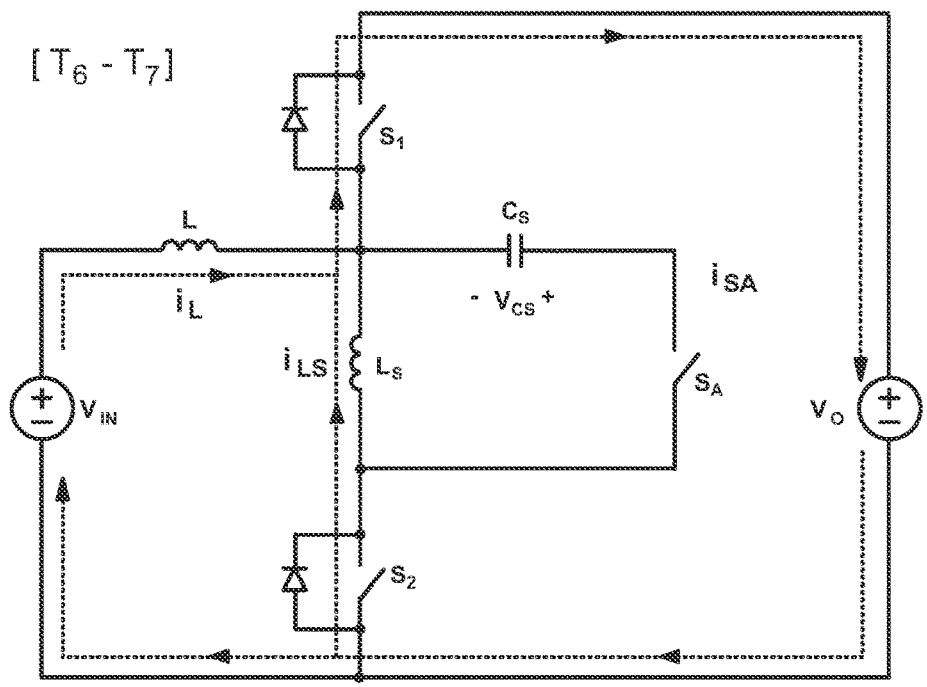

FIG. 6G shows the topological state of totem-pole PWM PFC power converter 400 during interval $[T_6, T_7]$. At time $T_6$, parasitic output capacitance $C_{OSS2}$ of main switch $S_2$ has discharged completely, so that series inductor current $i_{LS}$ flows entirely through the body diode of main switch $S_2$. Boost inductor current $i_L$ and series inductor current $i_{LS}$ are substantially equal in magnitude but of opposite polarity. Thus, the body diode of rectifier switch $S_1$ briefly carries a peak current that is twice the magnitude of the input current (i.e., the boost inductor current $i_L$). (The body diodes of both rectifier switch $S_1$ and main switch $S_2$ carry current in interval $[T_6, T_7]$.) Thus, according to Equation (2), voltage $V_{SA}$ across auxiliary switch $S_A$ is the sum of output voltage $V_O$ and series capacitor voltage $V_{CS}$ (i.e., $V_O+V_{CS}$), so that output voltage $V_O$ is imposed entirely across series inductor $L_S$. Hence, auxiliary switch $S_A$ does not carry any current, inductor current $i_{LS}$ increases linearly, and current $i_{S1}$ in rectifier switch $S_1$ decreases at the same rate:

$$\frac{di_{S1}}{dt} = -\frac{di_{LS}}{dt} = -\frac{V_O}{L_S} \qquad (5)$$

Thus, as shown in Equation (5), the rate of decrease in current of rectifier switch $S_1$ is controlled by series inductor $L_S$. Accordingly, the rectifier recovered charge and its associated loss may be reduced by selecting a suitable inductance for series inductor $L_S$. Generally, a larger inductance—which gives a lower rate of current decrease—results in a higher reduction of the reverse recovery associated losses.

Figure 6H:
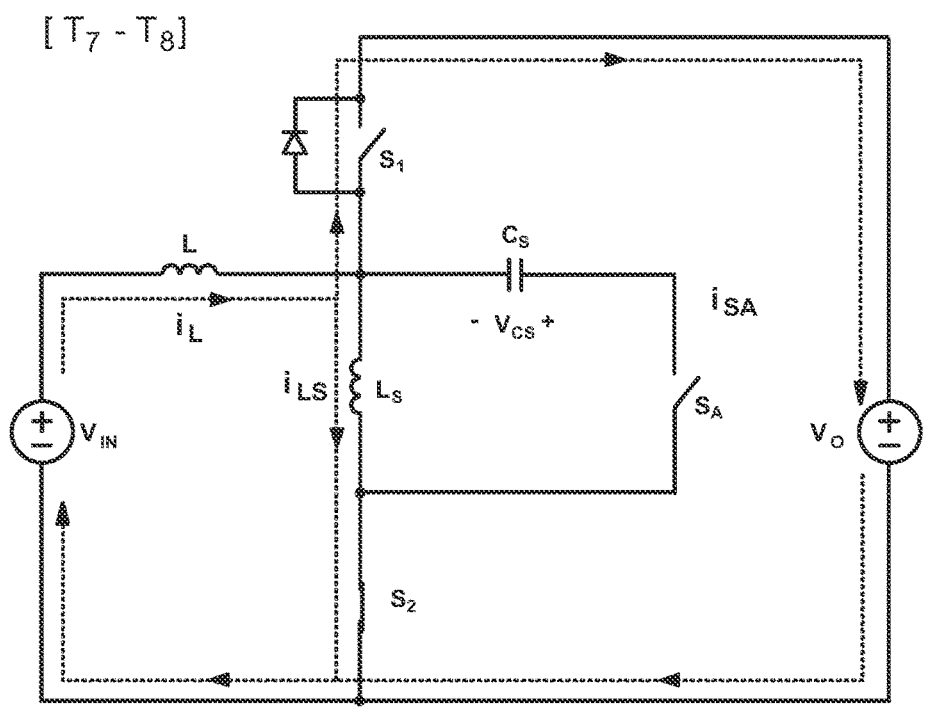

FIG. 6H shows the topological state of totem-pole PWM PFC power converter 400 during interval [$T_7$, $T_8$]. At time $T_7$, as main switch $S_2$ carries substantially all of current $i_{LS}$ of series inductor $L_S$, to achieve ZVS in main switch $S_2$, switch $S_2$ should turn on before series inductor current $i_{LS}$ polarity turns positive. Thus, at time $T_7$, as indicated in FIG. 7, main switch $S_2$ turns on immediately prior to series inductor current $i_{LS}$ turns positive. Should the control signal for main switch $S_2$ be delayed with respect to series inductor current $i_{LS}$ turning positive, parasitic output capacitance $C_{OSS2}$ of main switch $S_2$ may be fully or partially charged and thus the ZVS condition would not be achieved.

During interval [$T_6$, $T_8$], boost inductor current $i_L$ increases linearly at the rate of $$\frac{di_L}{dt} = \frac{V_{IN}}{L},$$

while series inductor current $i_{LS}$ increases linearly at the rate of $$\frac{di_{LS}}{dt} = \frac{V_O}{L_S}.$$

The inductance of series inductor $L_S$ is preferably much less than the inductance of boost inductor L, so that rate of change in series inductor current $i_{LS}$ is substantially higher than the rate of change in boost inductor current $i_L$.

Figure 6I:
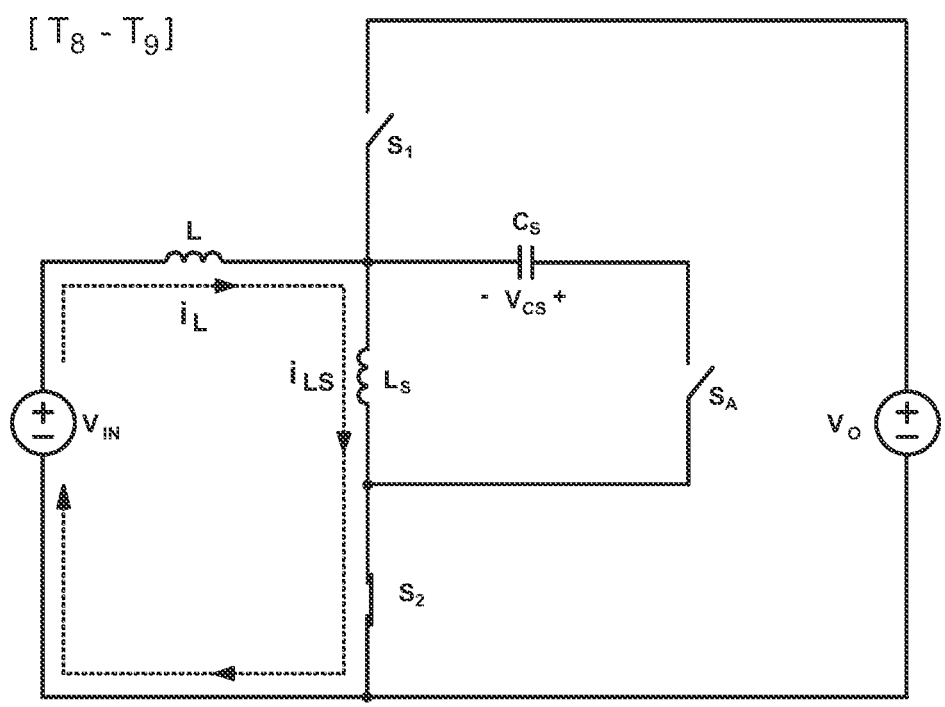

FIG. 6I shows the topological state of totem-pole PWM PFC power converter 400 during interval [$T_8$, $T_9$]. Boost inductor current $i_L$ and series-inductor current $i_{LS}$ become equal at time $T_8$, so that the current in rectifier switch $S_1$ becomes zero. However, as series inductor current $i_{LS}$ increases above boost inductor current $i_L$, parasitic output capacitance $C_{OSS1}$ of rectifier switch $S_1$ begins to charge. According to Equation (2), an increase in voltage $V_{S1}$ across rectifier switch $S_1$ is accompanied by a decrease in voltage $V_{SA}$ across auxiliary switch $S_A$, i.e., discharging parasitic output capacitance $C_{OSSA}$ of auxiliary switch $S_A$ and a decrease in the voltage imposed across series inductor $L_S$. As shown in FIG. 6I, series inductor current $i_{LS}$ eventually decreases to equal boost inductor current $i_L$. Voltage $V_{SA}$ across auxiliary switch $S_A$ becomes equal to series capacitor voltage $V_{CS}$, such that the voltage across series inductor $L_S$ becomes practically zero, and output voltage $V_O$ is imposed substantially entirely across rectifier switch $S_1$.

FIG. 7 shows that the voltage stresses on main switch $S_2$, rectifier switch $S_1$, and auxiliary switch $S_A$ is sum of output voltage $V_O$ and voltage $V_{CS}$ across series capacitor $C_S$ (i.e., $V_O+V_{CS}$), so that the stresses on main switch $S_2$ and rectifier switch $S_1$ is higher than the stresses on the corresponding switches in the conventional, hard-switched boost converter (e.g., AC-DC totem-pole boost converter 300 of FIG. 3). Thus, the selection of a suitable capacitance for series capacitor $C_S$ ensures a reasonable value for voltage $V_{CS}$, which keeps the voltage stresses on the switches to within reasonable limits.

The derivation of how circuit parameters in totem-pole PWM PFC power converter 400 depend on voltage $V_{CS}$ may be simplified by recognizing that intervals [$T_1$, $T_3$] and [$T_5$, $T_8$] (i.e., the commutation periods) are short relative to the intervals in which main switch $S_2$ and rectifier switch $S_1$ are conducting. As shown in FIG. 7, during interval [$T_1$, $T_4$], series capacitor $C_S$ discharges through series inductor current $i_{LS}$. Series inductor current $i_{LS}$ reverses polarity at time $T_4$ to charge series capacitor $C_S$ during interval [$T_4$, $T_6$]. Except during the commutation periods (i.e., intervals [$T_1$, $T_3$] and [$T_5$, $T_8$]) and during interval [$T_8$, $T_9$], the current in series capacitor $C_S$ has a substantially constant slope $$\frac{di_{LS}}{dt} = \frac{-V_{CS}}{L_S}.$$

(During interval [$T_8$, $T_9$], the current in series capacitor $C_S$ is substantially zero.) Let $I_L$ be the average value for boost inductor current $i_L$. To achieve ZVS in main switch $S_2$ and auxiliary switch $S_A$ (i.e., at time $T_3$, when series inductor current $i_{LS}$ equals $-I_L$) and in rectifier switch $S_1$ (i.e., at time $T_5$, when series inductor current $i_{LS}$ equals $I_L$), $$\frac{di_{LS}}{dt} = \frac{-V_{CS}}{L_S}$$

over interval [$T_3$, $T_5$] provides:

$$V_{CS} \approx \frac{L_S * 2I_L}{D' * T_S} \qquad (6)$$

where D' is the duty cycle of rectifier switch $S_1$, $T_S$ is the duration of the switching cycle and interval [$T_3$, $T_5$] is substantially period TON, when rectifier switch $S_1$ is turned on. For a lossless totem-pole power stage in which the current commutation intervals (i.e., [$T_1$, $T_3$] and [$T_5$,$T_8$]) are much shorter than $T_{ON}$, voltage conversion ratio $$\frac{V_O}{V_{IN}}$$

is given by:

$$\frac{V_O}{V_{IN}} = \frac{I_L}{I_O} = \frac{1}{1-D} = \frac{1}{D'} \qquad (7)$$

where $I_O$ is the average value of the output load current. Equation (6) may therefore be rewritten as:

$$V_{CS} \approx \frac{L_S * 2I_L * f_S * V_O}{V_{IN}} \quad (8)$$

where $f_S$ is the switching frequency.

Therefore, according to Equation (8), voltage $V_{CS}$ is maximum at full load (i.e., maximum $I_L$) and at the lowest line voltage (i.e., at minimum $V_{IN}$). For given input and output specifications (i.e., for given maximum $I_L$ and output voltage $V_O$), series capacitor voltage $V_{CS}$ may be reduced by reducing the $L_S*f_S$ product.

Totem-pole rectifiers are often used in input current-shaping applications, with the objectives being reducing harmonic contents and improving the power factor of the line current. In any such a current-shaping application, even though input voltage $V_{IN}$ varies during the line cycle, output voltage $V_O$ is required to be maintained substantially constant, while the duty cycle of the totem-pole rectifier varies from 0 to $$\frac{|V_{IN}|}{V_O}.$$

In a PFC rectifier, the input current shape preferably follows the input voltage shape. Thus, according to Equation (8), voltage $V_{CS}$ is substantially constant throughout the line cycle.

Figure 10:
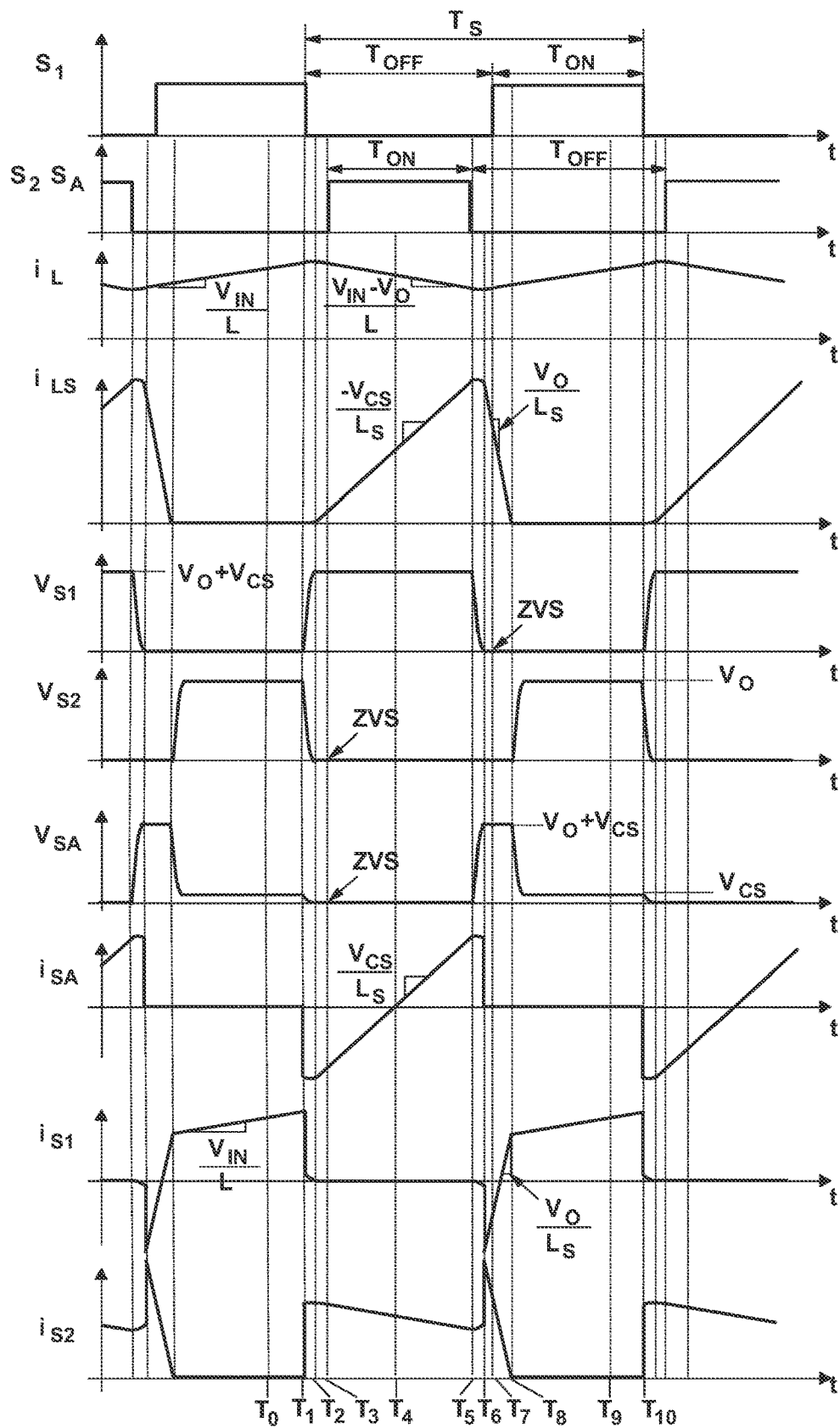
FIG. 10 shows key power stage waveforms over switching cycle $T_S$ during the negative half-cycle of input voltage $V_{AC}$ (i.e., $V_{AC}<0$).

FIG. 8 shows circuit model 480, representing the equivalent circuit for totem-pole PWM PFC power converter 400 during the negative half-cycle of input voltage $V_{AC}$ (i.e., $V_{AC}$<0). FIGS. 9A-9I show the topological states of totem-pole PWM PFC power converter 400 over switching cycle $T_S$ during the negative half-cycle of input voltage $V_{AC}$. FIG. 10 shows key power stage waveforms over switching cycle $T_S$ during the negative half-cycle of input voltage $V_{AC}$ (i.e., $V_{AC}$<0). In the negative half-cycle of input voltage $V_{AC}$, active soft-switching cell 401 of totem-pole PWM PFC power converter 400 operates substantially as explained above with respect to FIGS. 6A-6I and FIG. 7, with the roles of the switches reversed (i.e., switch $S_1$ serves as the main switch, and switch $S_2$ serves as the rectifier switch). A detailed description of FIGS. 9A-9I and FIG. 10 are therefore omitted. However, note that, in the negative half-cycle of input voltage $V_{AC}$, when main switch $S_1$ is turned on, no current flow through series inductor $L_S$, as input voltage $V_{AC}$ is imposed entirely across boost inductor L. (Compare FIGS. 6A and 6I to FIGS. 9A and 9I, for intervals $[T_0, T_1]$ and $[T_8, T_9]$). Thus, the peak current in series inductor $L_S$ is approximately twice as large in the negative half-cycle, as compared to the positive half-cycle.

The control circuit for totem-pole PWM PFC power converter 400 may be implemented in the same manner as its conventional "hard-switched" totem-pole rectifier counterpart, so long as an additional gate-driver circuit is provided for auxiliary switch $S_A$. Specifically, for input current-shaping applications, totem-pole PWM PFC power converter 400 may be implemented using any suitable control technique (e.g., average-current control, peak-current control, or hysteretic control).

Figure 11:
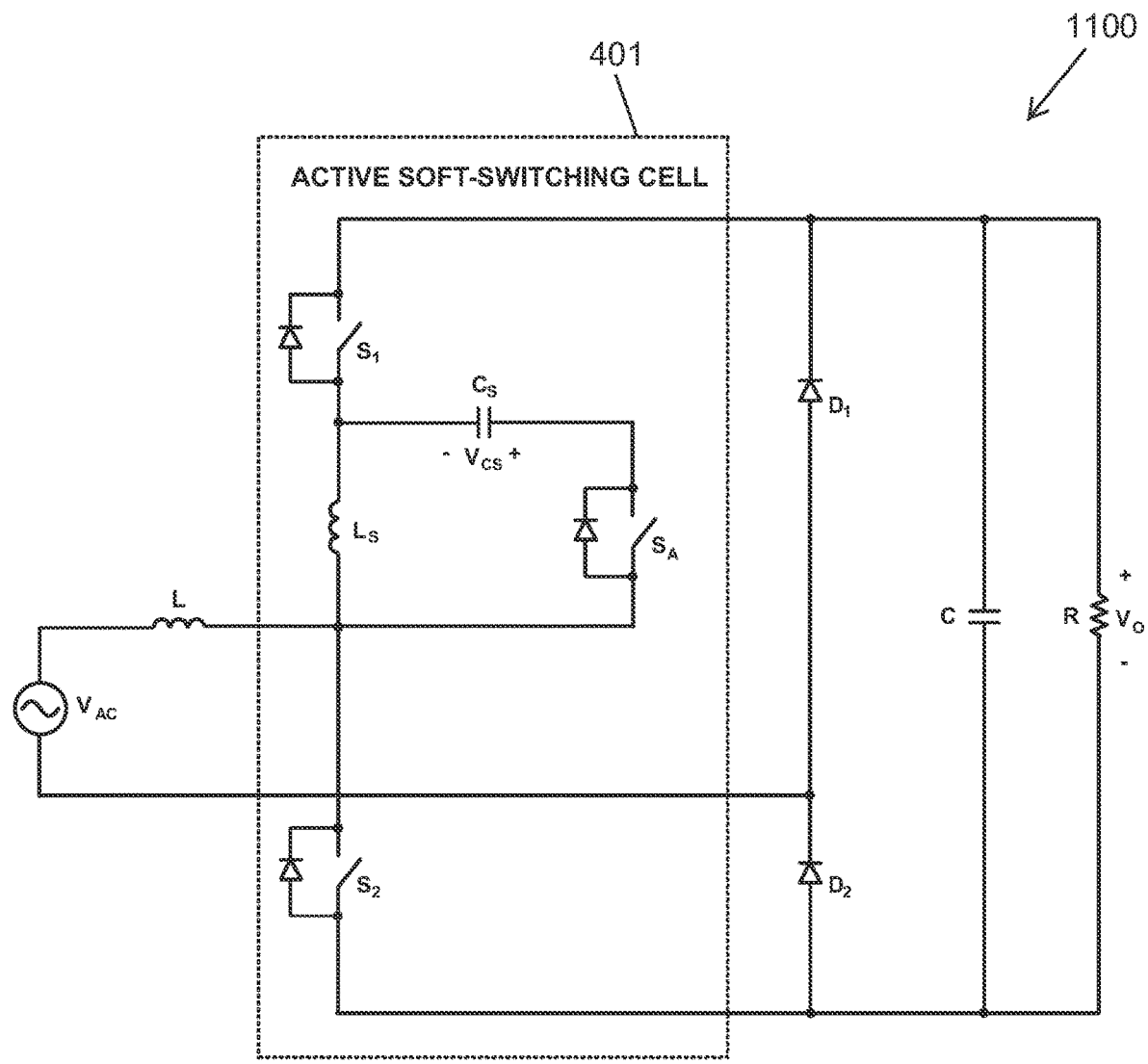
FIG. 11 shows active soft-switching cell 401 being incorporated into unidirectional AC-DC totem-pole power converter 1100, in accordance with one embodiment of the present invention; unlike totem-pole PWM PFC power converter 400, AC-DC totem-pole power converter 1100 has boost inductor L being coupled to the common electrical node between series inductor $L_S$ and auxiliary switch $S_A$.

FIG. 11 shows active soft-switching cell 401 being incorporated into unidirectional AC-DC totem-pole power converter 1100, in accordance with one embodiment of the present invention; unlike PWM PFC power converter 400, AC-DC totem-pole power converter 1100 has boost inductor L being coupled to the common electrical node between series inductor $L_S$ and auxiliary switch $S_A$. For any power converter using an active soft-switching cell of the present invention, boost inductor L may be connected to either the common electrical node between series inductor $L_S$ and switch $S_2$ or the common electrical node between series inductor $L_S$ and switch $S_1$. This result may be seen from the equivalent circuits for each configuration in the positive and negative half-cycles of input voltage $V_{AC}$. The equivalent circuits for AC-DC totem pole power converter 1100 are model 480 of FIG. 8 under the positive half-cycle (i.e., $V_{AC}$>0), with switch $S_2$ as the rectifier switch, and model 450 of FIG. 5 under the negative half-cycle of input voltage $V_{AC}$ (i.e., $V_{AC}$<0), with switch $S_1$ as the rectifier switch. Thus, totem-pole PWM PFC power converter 400 in the positive and negative half-cycles operate substantially identically to AC-DC totem-pole power converter 1100 in the negative and positive half-cycles, respectively.

Figure 12:
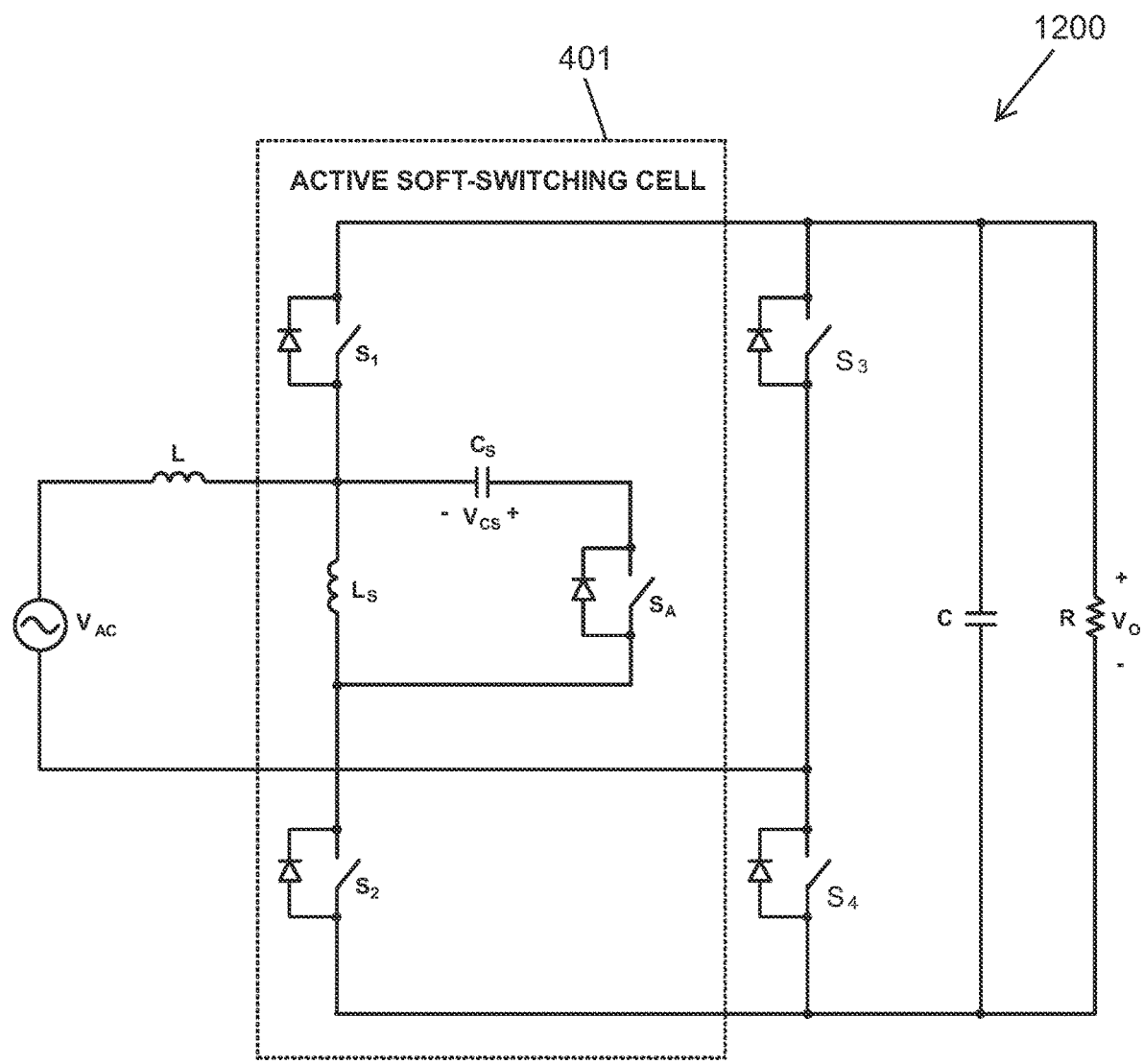
FIG. 12 shows active soft-switching cell 401 being incorporated into bidirectional AC-DC totem-pole power converter 1200, in accordance with one embodiment of the present invention; unlike totem-pole PWM PFC power converter 400, diodes $D_1$ and $D_2$ are replaced by synchronous rectifiers $S_3$ and $S_4$.

FIG. 12 shows active soft-switching cell 401 being incorporated into bidirectional AC-DC totem-pole power converter 1200, in accordance with one embodiment of the present invention; unlike totem-pole PWM PFC power converter 400, diodes $D_1$ and $D_2$ are replaced by switches or synchronous rectifiers $S_3$ and $S_4$. Synchronous rectifiers (e.g., switches $S_3$ and $S_4$) have much lower voltage drops than passive diodes $D_1$ and $D_2$, thus providing increased converter efficiency. Note that, diodes $D_1$ and $D_2$ in totem-pole configuration in any of the configurations herein may be replaced by synchronous rectifiers to achieve the converter efficiency advantage.

Figure 13:
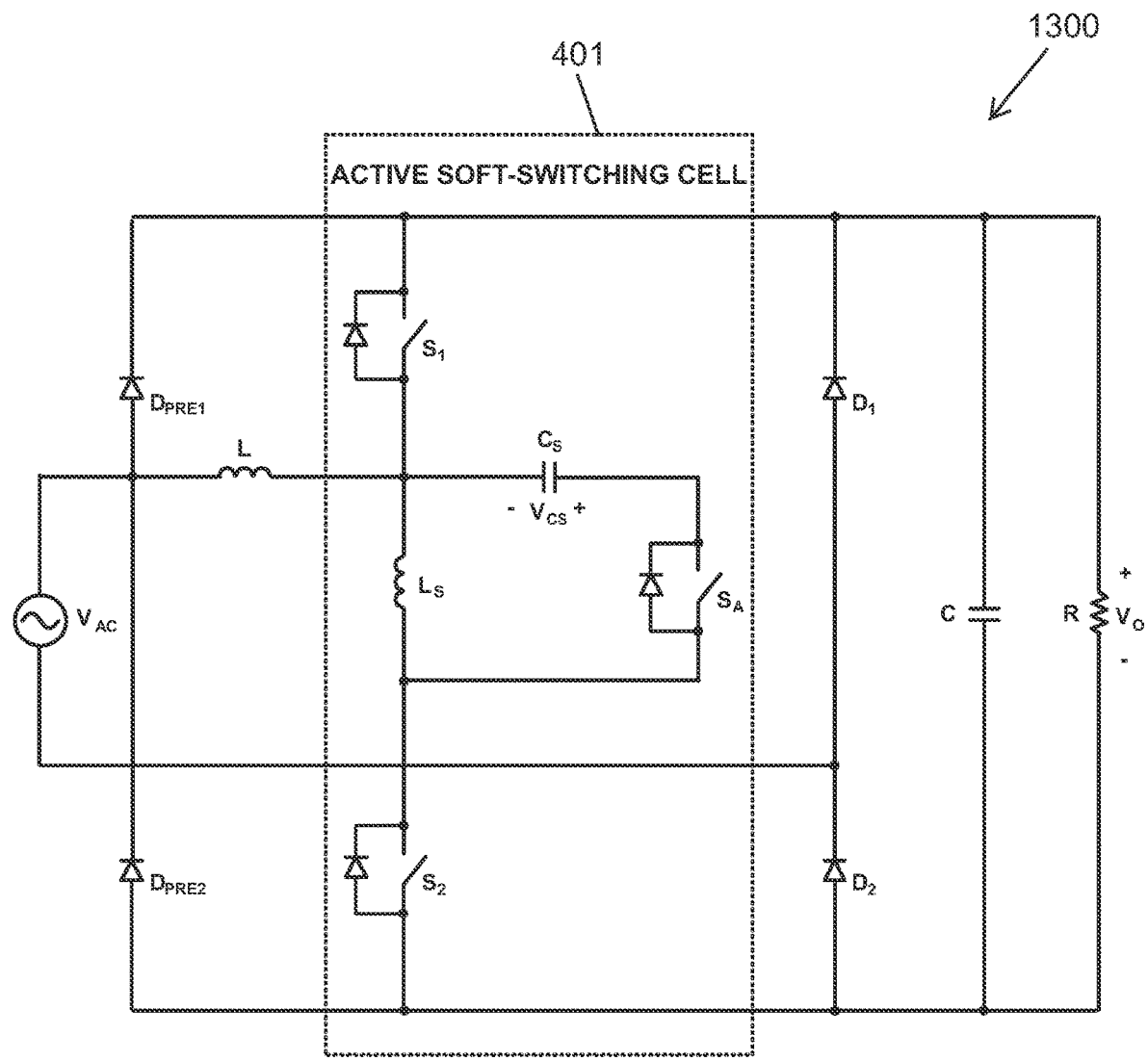
FIG. 13 shows active soft-switching cell 401 being incorporated into AC-DC totem-pole power converter 1300, according to one embodiment of the present invention; unlike totem-pole PWM PFC power converter 400, diodes $D_{PRE1}$ and $D_{PRE2}$ charge the output DC link at start-up or when active soft-switching cell 401 is inactive, thereby bypassing active soft-switching cell 401.

FIG. 13 shows active soft-switching cell 401 being incorporated into AC-DC totem-pole power converter 1300, according to one embodiment of the present invention; unlike totem-pole PWM PFC power converter 400, diodes $D_{PRE1}$ and $D_{PRE2}$ charge the output DC link (e.g., across filter capacitor C) at start-up or when active soft-switching cell 401 is inactive, thereby bypassing active soft-switching cell 401. Diodes $D_{PRE1}$ and $D_{PRE2}$ are typically silicon devices. Once the DC link is charged, diodes $D_{PRE1}$ and $D_{PRE2}$ would no longer conduct, as current from the AC source would go through active soft-switching cell 401.

FIG. 14 shows active soft-switching cell 401 being incorporated into bidirectional AC-DC totem-pole power converter 1400, in accordance with one embodiment of the present invention. Note also that diodes $D_1$ and $D_2$ are replaced by synchronous rectifiers $S_3$ and $S_4$ to take advantage of the higher converter efficiency discussed above.

Figure 15:
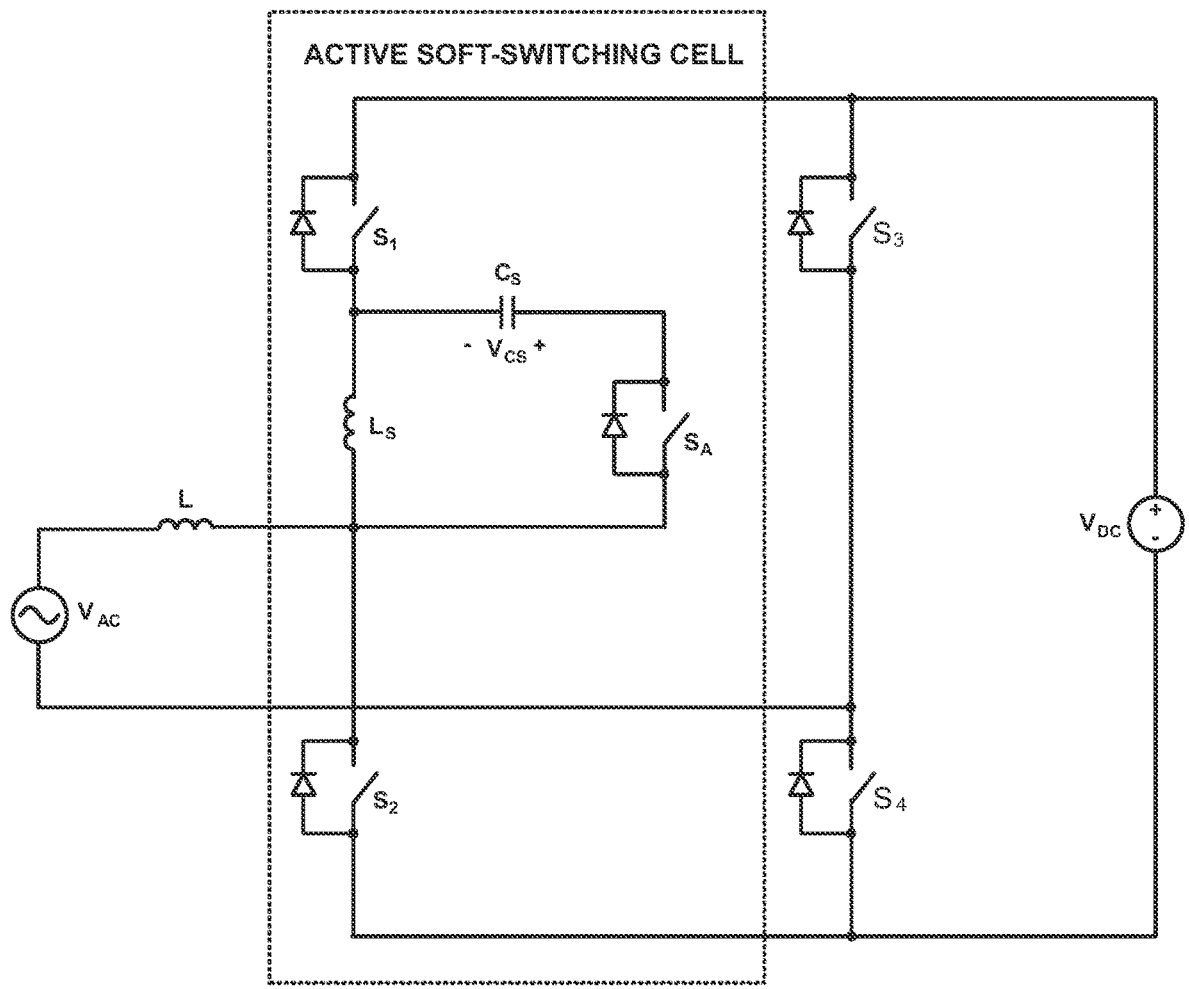
FIG. 15 shows active soft-switching cell 401 being incorporated into bidirectional AC-DC totem-pole power converter 1500, in accordance with one embodiment of the present invention; unlike bidirectional AC-DC totem-pole power converter 1400, boost inductor L in AC-DC totem-pole power converter 1500 is coupled to the common electrical node between series inductor $L_S$ and auxiliary switch $S_A$.

FIG. 15 shows active soft-switching cell 401 being incorporated into bidirectional AC-DC totem-pole power converter 1500, in accordance with one embodiment of the present invention; unlike bidirectional AC-DC totem-pole power converter 1400, boost inductor L in AC-DC totem-pole power converter 1500 is coupled to the common electrical node between series inductor $L_S$ and auxiliary switch $S_A$. As discussed above, these configurations operate in a substantially equivalent manner.

Figure 16:
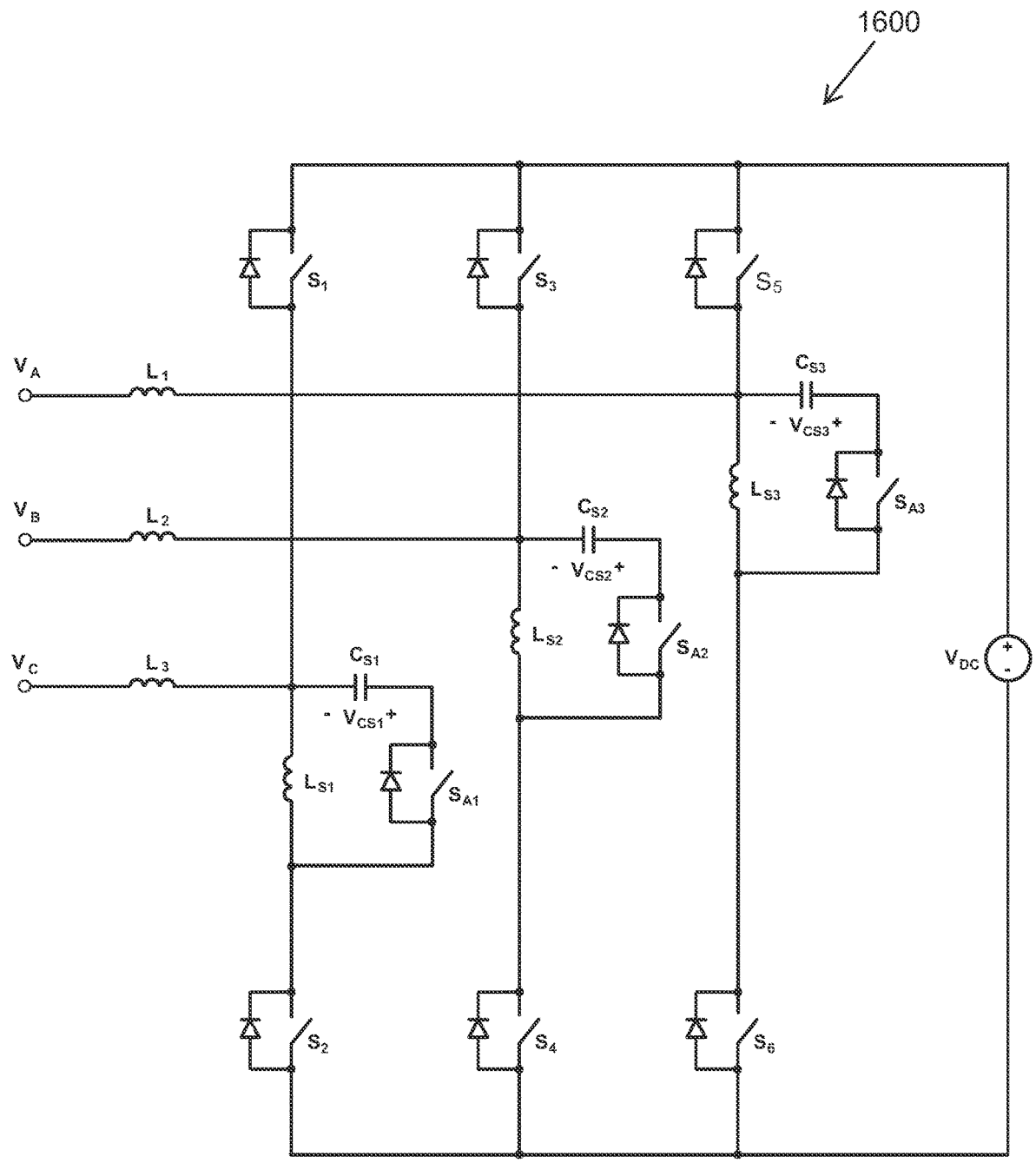
FIG. 16 shows active soft-switching cell 401 being incorporated into multi-phase power converter 1600, in accordance with one embodiment of the present invention.

FIG. 16 shows multi-phase power converter 1600, according to one embodiment of the present invention. As shown in FIG. 16, multi-phase power converter 1600 is a bidirectional 3-phase AC-DC power converter that incorporates active soft-switching cell 401 of FIG. 4. Multi-phase power converter 1600 is coupled between an AC circuit and a DC circuit. As AC circuit may be a multi-phase AC source, it includes multiple phase terminals. The DC circuit may be a resistive load or a DC power source. Multi-phase power converter 1600 includes multiple component circuits ("phase legs") each coupled to a phase terminal of the AC circuit. Each phase leg of multi-phase power converter 1600 includes an inductor (i.e., inductor $L_1$, $L_2$ or $L_3$), which couples the phase leg to the corresponding phase terminal, and an active soft-switching cell. The active soft-switching cell of each phase leg includes (i) a series inductor (i.e., inductor $L_{S1}$, $L_{S2}$ or $L_{S3}$), (ii) first and second switches (i.e., switches $S_1$ and $S_2$, switches $S_3$ and $S_4$, or switches $S_5$ and $S_6$), (iii) an auxiliary switch (i.e., switch $S_{A1}$, $S_{A2}$ or $S_{A3}$) and (iv) an auxiliary capacitor (i.e., $C_{S1}$, $C_{S2}$, or $C_{S3}$). Any of the switches may open under a ZVS condition. At least one of the switches may be a carbide MOSFET. In each phase leg, the series inductor and the first and second switches form a series circuit across the DC circuit. Also, in each phase leg, either the first switch (i.e., first switch $S_1$, $S_3$ or $S_5$) or the second switch (i.e., $S_2$, $S_4$ or $S_6$) serves as a rectifier switch that opens and closes simultaneously with the auxiliary switch (i.e., switch $S_{A1}$, $S_{A2}$ or $S_{A3}$). In each phase leg, the series inductor (i.e., series inductor $L_{S1}$, $L_{S2}$ or $L_{S3}$) reduces the rate of current change when the rectifier switch opens. The reduced rate of current change may reduce reverse recovery loss in the rectifier switch.

In FIG. 16, a 3-phase AC source provides 3 lines of voltages $V_A$, $V_B$, and $V_C$. The 3 lines may be provided from a Y- or WYE connection or a delta connection. As shown in FIG. 16, each leg of the three phases include an instance of active soft-switching cell 401 coupled to a corresponding boost inductor (i.e., boost inductors $L_1$, $L_2$, and $L_3$). The number of phase legs may be any suitable number required to deliver the desired power, according to the application. Note that, in a multi-phase power converter, the phase-return path for each phase leg is provided by other phase legs, such that totem-pole rectifier stage (e.g., diodes or synchronous rectifiers) is not required.

Figure 17:
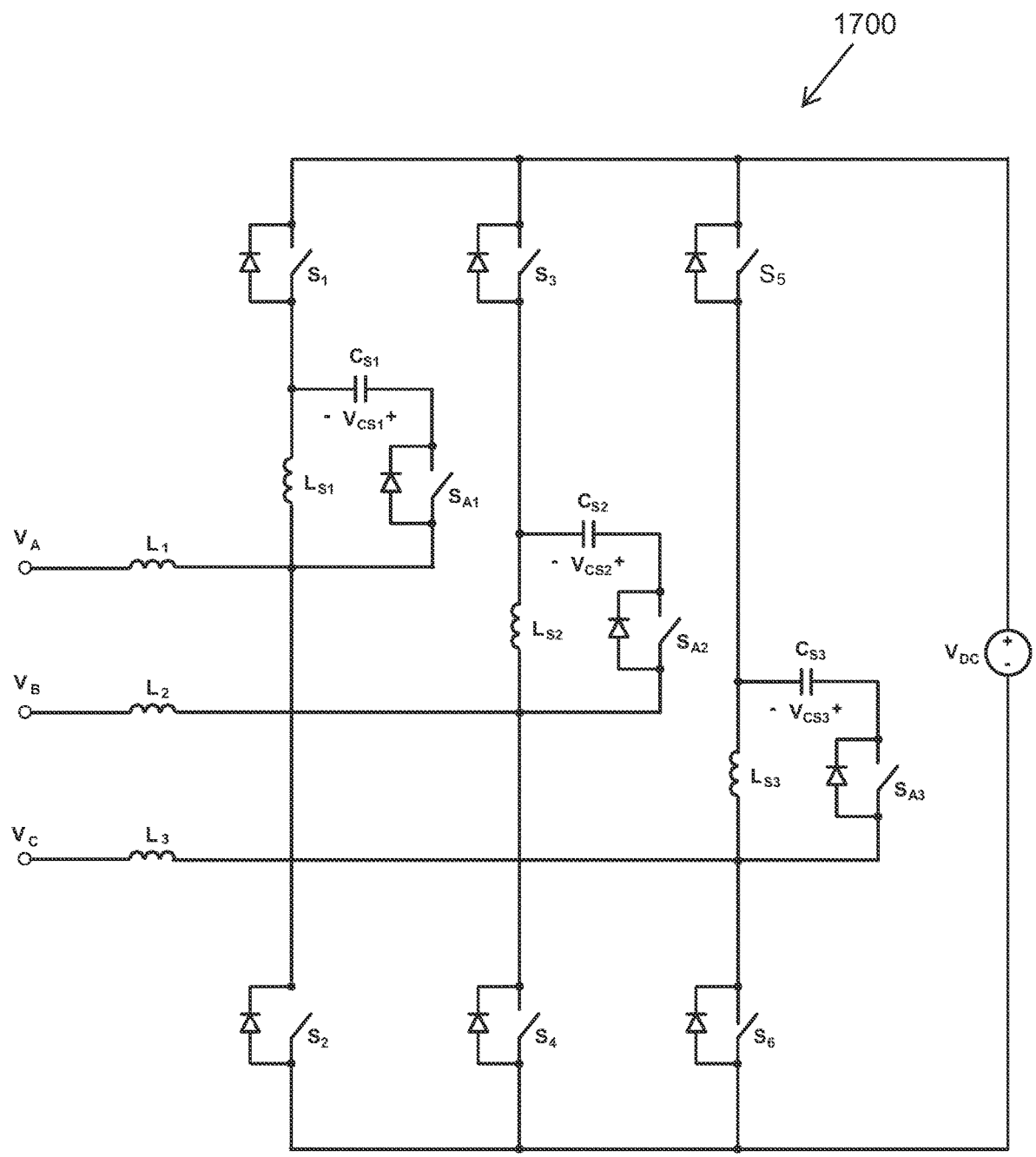
FIG. 17 shows multi-phase power converter 1700, according to one embodiment of the present invention; unlike bidirectional 3-phase AC-DC power converter 1600, each boost inductor boost inductor in multi-phase power converter 1700 is coupled to the common electrical node between the series inductor and the auxiliary switch in the corresponding active soft-switching cell.

FIG. 17 shows multi-phase power converter 1700, according to one embodiment of the present invention. As in multi-phase power converter 1600, multi-phase power converter 1700 is coupled between an AC circuit and a DC circuit. As the AC circuit may be a multi-phase AC source, it includes multiple phase terminals. The DC circuit may be a resistive load or a DC power source. Unlike multi-phase power converter 1600, each boost inductor (i.e., inductor $L_1$, $L_2$, or $L_3$) in multi-phase power converter 1700 is coupled to the common electrical node between the series inductor (i.e., series inductor $L_{S1}$, $L_{S2}$, or $L_{S3}$) and the auxiliary switch (i.e., switch $S_{A1}$, $S_{A2}$, or $S_{A3}$) in the corresponding active soft-switching cell. In each phase leg, the series inductor and the first and second switches form a series circuit across the DC circuit. Also, in each phase leg, either the first switch (i.e., first switch $S_1$, $S_3$ or $S_5$) or the second switch (i.e., $S_2$, $S_4$ or $S_6$) serves as a rectifier switch that opens and closes simultaneously with the auxiliary switch (i.e., switch $S_{A1}$, $S_{A2}$ or $S_{A3}$). Any of the switches may open under a ZVS condition. At least one of the switches may be a carbide MOSFET. In each phase leg, the series inductor (i.e., series inductor $L_{S1}$, $L_{S2}$ or $L_{S3}$) reduces the rate of current change when the rectifier switch opens. The reduced rate of current change may reduce reverse recovery loss in the rectifier switch. As in multi-phase power converter 1600, the number of phase terminals and phase legs may be any suitable number required to deliver the desired power, according to the application.

The present invention substantially reduces the switching losses in an AC-DC power conversion system caused by the turn-on characteristics of a main switch and the reverse-recovery characteristic of a rectifier, using an active soft-switching cell, as that described in the embodiments above. Specifically, the reverse-recovery related losses are reduced by the series inductor in the active soft-switching cell, which reduces the rate of current change in the body diode of the rectifier switch during its turn-off. The switches in the active soft-switching cell may operate under ZVS conditions.

While various embodiments of the present invention have been described above, the present invention has been presented only by way of illustrative examples in these embodiments, and has not been limited. Thus, the breadth and scope of the present invention should not be limited by any of the above described embodiments but should instead be defined only in accordance with the following claims and their equivalents.

We claim:

1. A power converter configured for coupling to (i) an AC circuit having first and second terminals and (ii) a DC circuit, comprising: a first inductor, having first and second terminals, the first terminal of the first inductor being coupled to the first terminal of the AC circuit; first and second rectifiers connected at a common node, wherein the first and second rectifiers form a series circuit coupled in parallel to the DC circuit, and wherein the common node is coupled to the second terminal of the AC circuit; an active soft-switching cell, comprising: a second inductor having first and second terminals; first and second switches, wherein the first switch, the second inductor and the second switch form a series circuit coupled in parallel to the series circuit of the first and the second rectifiers; a third switch; and a first capacitor, wherein the third switch and the first capacitor form a series circuit that is coupled in parallel to the second inductor; and wherein the second terminal of the first inductor is coupled to the first terminal or the second terminal of the second inductor, wherein one of the first and second switch serves as a rectifier switch that opens and closes simultaneously with the third switch, and wherein the second inductor has an inductance that reduces the rate of current change when the rectifier switch opens.

2. The power converter of claim 1, wherein at least one of the switches comprises a silicon carbide metal-oxide-semiconductor field-effect transistor (MOSFET).

3. The power converter of claim 1, wherein the power converter is configured to operate in a bidirectional manner.

4. The power converter of claim 1, wherein the AC circuit comprises an AC power source, and wherein the DC circuit comprises at least one of: a resistive load and a DC power source.

5. The power converter of claim 1, further comprising a filter capacitor connected in parallel to the first and second rectifiers.

6. The power converter of claim 1, wherein one or more of the first and second rectifiers comprise a synchronous rectifier.

7. The power converter of claim 1, wherein the reduced rate of current change reduces reverse recovery loss in the rectifier switch.

8. The power converter of claim 1, wherein one or more of the first switch, the second switch and the third switch open under a zero-voltage switching condition.

9. The power converter of claim 1, wherein the first inductor is coupled to a common electrical node between the first switch and the second inductor.

10. The power converter of claim 1, wherein the first inductor is coupled to a common electrical node between the second switch and the second inductor.

11. A multi-phase power converter configured for coupling to (i) an AC circuit having a plurality of terminals ("phase terminals"), each coupled to a phase of a multi-phase AC power source, and (ii) a DC circuit, the multi-phase power converter having a plurality of component circuits ("phase legs"), each phase leg comprising: a first inductor, having first and second terminals, the first terminal of the first inductor being coupled to one of the phase terminals of the AC circuit; and an active soft-switching cell, comprising: a second inductor having first and second terminals; first and second switches, wherein the first switch, the second inductor and the second switch form a series circuit that is coupled in parallel to the DC circuit; a third switch; and a first capacitor, wherein the third switch and the first capacitor form a series circuit that is coupled in parallel to the second inductor; and wherein the second terminal of the first inductor is coupled to the first terminal or the second terminal of the second inductor, wherein, in each phase leg, one of the first and second switch serves as a rectifier switch that opens and closes simultaneously with the third switch, and wherein the second inductor has an inductance that reduces the rate of current change when the rectifier switch opens.

12. The multi-phase power converter of claim 11, wherein at least one of the switches comprises a silicon carbide (SiC) metal-oxide-semiconductor field-effect transistor (MOSFET).

13. The multi-phase power converter of claim 11, wherein the multi-phase power converter is configured to operate in a bidirectional manner.

14. The multi-phase power converter of claim 11, further comprising a filter capacitor connected in parallel to the DC circuit.

15. The multi-phase power converter of claim 11, wherein the reduced rate of current change reduces reverse recovery loss in the rectifier switch.

16. The multi-phase power converter of claim 11, wherein, in each phase leg, one or more of the first switch, the second switch, and the third switch open under a zero-voltage switching condition.

17. The multi-phase power converter of claim 11, wherein the first inductor in each phase leg is coupled to a common electrical node between the first switch and the second inductor in the corresponding active soft-switching cell.

18. The multi-phase power converter of claim 11, wherein the first inductor in each phase leg is coupled to a common electrical node between the second switch and the second inductor in the corresponding active soft-switching cell.

* * * * *